United States Patent [19]

Hirose et al.

[11] Patent Number: 5,484,140

[45] Date of Patent: Jan. 16, 1996

[54] CATCH TYPE SHEET TRAY FOR AN IMAGE FORMING APPARATUS

[75] Inventors: Hiroshi Hirose, Sagamihara; Kenji Hiratani, Atsugi; Masashi Kimijima, Ayase, all of Japan

[73] Assignee: Ricoh Company, Ltd., Tokyo, Japan

[21] Appl. No.: 149,560

[22] Filed: Nov. 9, 1993

[30] Foreign Application Priority Data

| Nov. 9, 1992 | [JP] | Japan | 4-298276 |
| Feb. 3, 1993 | [JP] | Japan | 5-016215 |
| Mar. 2, 1993 | [JP] | Japan | 5-040994 |
| Apr. 13, 1993 | [JP] | Japan | 5-086033 |

[51] Int. Cl.⁶ .................................................. R65H 31/00
[52] U.S. Cl. .......................... 271/175; 271/186; 271/314; 271/274; 271/207
[58] Field of Search .................................. 271/175, 184, 271/185, 186, 188, 207, 209, 272, 273, 274, 314

[56] References Cited

U.S. PATENT DOCUMENTS

| 5,157,450 | 10/1992 | Kim | 271/186 X |
| 5,249,793 | 10/1993 | Scheufler | 271/188 X |

FOREIGN PATENT DOCUMENTS

| 0056456 | 5/1981 | Japan | 271/186 |
| 0077157 | 5/1982 | Japan | 271/185 |
| 1433852 | 8/1984 | Japan | 271/186 |
| 0220676 | 9/1989 | Japan | 271/186 |
| 3223061 | 10/1991 | Japan | 271/314 |
| 5294530 | 11/1993 | Japan | 271/314 |

OTHER PUBLICATIONS

RH, Copied Sheet Sequence Reverser, Sep. 1977, pp. 1592–1593, IBM Technical Disclosure Bulletin vol. 20 No. 4.

*Primary Examiner*—William E. Terrell
*Assistant Examiner*—Carol L. Druzbick
*Attorney, Agent, or Firm*—Oblon, Spivak, McClelland, Maier & Neustadt

[57] ABSTRACT

A catch type sheet tray for accommodating sheets sequentially driven out of an image forming apparatus by catching the leading edges of the sheets. The tray has a transport unit for transporting the sheet driven out through the outlet downward. A holder receives the sheet conveyed by the transport unit by catching the leading edge of the sheet while causing the trailing edge of the sheet to hand down to the outside. A mounting section mounts the transport unit on a portion of the apparatus from which the horizontal tray has been removed. The catch type tray is mounted on the apparatus in place of the horizontal tray.

40 Claims, 22 Drawing Sheets

FIG.26A

|  |  |
|---|---|
| | RECEPTION 93 |
| DATE | '92 9 12 (Fri) AM 11:11 |
| NUMBER OF SHEETS | B4 5 CATCH TRAY |
| TOTAL | 7 SHEETS B5 8 HORIZONTAL TRAY |
| ADDRESSER | |

FIG.26B

| No | TOTAL | TRAY A | TRAY B | TIME |
|---|---|---|---|---|
| 1 | 5 | B4 (3) | B5 (2) | 11:00 |
| 2 | 2 | A4 (2) | — | 11:15 |
| 3 | 7 | B4 (3) A4 (4) | — | 13:20 |

CATCH TYPE SHEET TRAY FOR AN IMAGE FORMING APPARATUS

BACKGROUND OF THE INVENTION

The present invention relates to a facsimile apparatus, copier, printer or similar image forming apparatus and, more particularly, to a catch type sheet tray mounted on an image forming apparatus for accommodating sheets sequentially driven out of the apparatus by holding the leading edges thereof.

Generally, sheets sequentially driven out of a facsimile apparatus, for example, are accommodated in either of a horizontal tray and a catch type tray. The horizontal tray simply stacks the sheets delivered thereto along a horizontal path. On the other hand, the catch type tray catches the leading edges of the sheets and causes the trailing edges of the sheets to hang down to the outside of the tray. The catch type tray is advantageous over the horizontal tray in the space saving aspect.

However, the catch type tray has some problems left unsolved, as follows. This type of tray is usually constructed integrally with the body of the image forming apparatus, and sheets have to be accommodated in the tray without exception. Hence, when sheets are longer than the tray, they have to be held by the tray in a bent position and, therefore, suffer from curls which render handling difficult. When more than the number of sheets which the tray can accommodate are discharged from the apparatus, the excess sheets bulge out from the tray and drop onto the floor. Further, while the apparatus body is discharging sheets, a roller included in the tray for catching sheets is continuously rotated. This brings about a problem that when more than the predetermined number of sheets are driven out of the apparatus, the roller is apt to scratch or otherwise damage the last sheet caught. Moreover, such a roller is likely to roll up sheets more than necessary since a driving force i s constantly transmitted thereto. In addition, with the catch type tray, it is impossible for a person to return the sheets to the tray after separating only the sheets addressed to him. The person, therefore, has to deal with even the sheets addressed to other persons.

Techniques relating to the catch type tray are taught in, for example, Japanese Utility Model Publication Nos. 668/1988 and 6118/1988, Japanese Patent Publication Nos. 2862/1988, 8023/1988, 56149/1988 and 55115/1989, Japanese Patent Laid-Open Publication (Kokai) Nos. 101263/1988, 218463/1988 and 267259/1991. These prior art techniques allow sheets driven out of the apparatus to be accommodated in the correct order, while saving the overall space for installation and operation. However, even such elaborated approaches cannot eliminate the problems discussed above.

SUMMARY OF THE INVENTION

It is, therefore, an object of the present invention to provide a catch type sheet tray capable of accommodating sheets driven out of an image forming apparatus reliably.

In accordance with the present invention, a catch type sheet tray for an image forming apparatus which records data in sheets and sequentially discharges the sheets to a horizontal tray via an outlet thereof comprises a transport unit for transporting the sheet driven out through the outlet downward, a holder for receiving the sheet conveyed by the transport unit by catching the leading edge of the sheet and causing the trailing edge of the sheet to hand down to the outside, and a mounting section for mounting the transport unit on a portion of the apparatus from which the horizontal tray has been removed. The catch type tray is mounted on the apparatus in place of the horizontal tray.

BRIEF DESCRIPTION OF THE DRAWINGS

The above and other objects, features and advantages of the present invention will become more apparent from the following detailed description taken with the accompanying drawings in which:

FIGS. 26A and 26B show specific log data relating to sheet discharge and recorded by the apparatus of FIG. 19.

In the figures, the same or similar constituent parts are designated by the same reference numerals, and a detailed description thereof will not be made in order to avoid redundancy.

DESCRIPTION OF THE PREFERRED EMBODIMENTS

Figure 1:
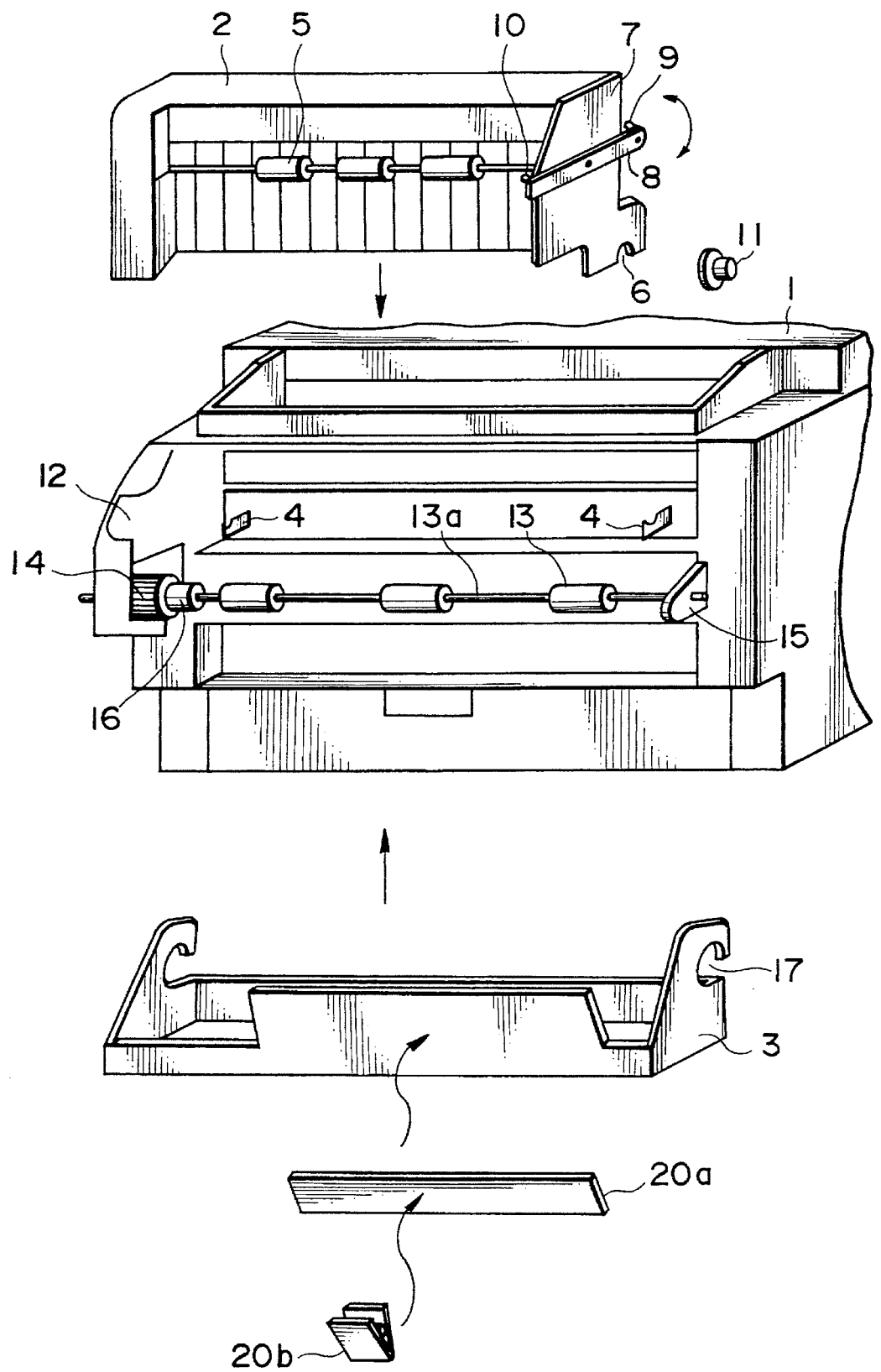
FIG. 1 is a perspective view of a first embodiment of the catch type sheet tray in accordance with the present invention.

Referring to FIG. 1 of the drawings, a first embodiment of the catch type sheet tray in accordance with the present invention is shown and mounted on a facsimile apparatus 1 by way of example. There are shown in the figure a transport unit 2 for transporting a sheet, or printing, coming out of the apparatus 1, a holder 3 for accommodating the sheet driven by the transport unit 2, and tray brackets 4 attached to the sheet outlet side of the apparatus 1. The tray brackets 4 form a part of a first and a second mounting and opening/closing section. The transport unit 2, holder 3 and tray brackets 4 are the major constituents of the embodiment.

The transport unit 2 has a discharge roller 5 for discharging a sheet driven out of the apparatus 1. A frame 7 is formed with a bearing portion 6 for mounting the transport unit 2 to the apparatus 1. A lock arm is used to selectively lock or unlock the transport unit 2 to or from the apparatus 1. A pin 9 is studded on the lock arm 8 and locks the transport unit 2 to the apparatus I by being retained by one of the tray brackets 4. A button 10 is provided on the lock arm 8 and operated by a person to unlock the transport unit 2 from the apparatus 1. Further, a cap 11 is associated with the lock arm 8 for holding the apparatus 1 at the bearing portion 6. The pin 9, button 10 and cap 11 also form a part of the first and second mounting and opening/closing sections.

A drive bracket 12 is also affixed to the side of the apparatus 1 and provided with an idle gear for transmitting a driving force generated in the apparatus to the discharge roller 5 of the transport unit 2. A conveyor roller 13 drives a sheet toward the holder 3 and retains the sheet accommodated in the holder 3. A conveyor roller gear 14 causes the roller 13 to rotate on receiving the driving force from the drive bracket 12. A bracket 15 supports the conveyor roller 13. A torque limiter 16 plays the role of a first brake section for braking the conveyor roller 13. A shaft 13a, on which the conveyor roller 13 is mounted, serves as a fulcrum for mounting and opening/closing the transport unit 2 and mounting the holder 3. The shaft 13a is journalled to the drive bracket 12 via the torque limiter 16 and to a bracket 15 affixed to one of opposite side walls of the apparatus 1.

To mount the transport unit 2 to the facsimile apparatus 1, the bearing portions 6 of the frame 7 are put on opposite ends of the shaft 13a of the conveyor roller 13 and then retained by the caps 11. Subsequently, the pins 9 of the lock arms 8 are brought into engagement with the tray brackets 4 of the apparatus 1. To remove the transport unit 2 from the apparatus 1, the buttons 10 of the lock arms 8 are pressed down to release the pins 9 from the tray brackets 4. In this condition, the transport unit 2 can be rotated about the shaft 13a and removed from the apparatus 1. The holder 3 is formed with notches 17 and rotatably mounted on the apparatus 1 with the notches 17 matching with the shaft 13a. Hence, the holder 3 is not effected by the opening/closing movement of the transport unit 2. It follows that when the transport unit 2 is opened while sheets are accommodated in the holder 3, the sheets are prevented from falling. Even when the holder 3 is affixed to the side of the apparatus 1, the transport unit is rotatable.

As the number of sheets stacked on the holder 3 sequentially increases, the stack contacts the conveyor roller 13 with the result that a frictional force acts between them. When the frictional force or load acting on the conveyor roller 13 increases to a predetermined level, the torque limiter 16 is operated to interrupt the operative connection of the conveyor roller gear 14 and conveyor roller 13. Consequently, the gear 14 idles and stops the rotation of the roller 13. As a result, the stack in the holder 3 is freed from excessive loads and, therefore, protected from damage.

Figure 2A:
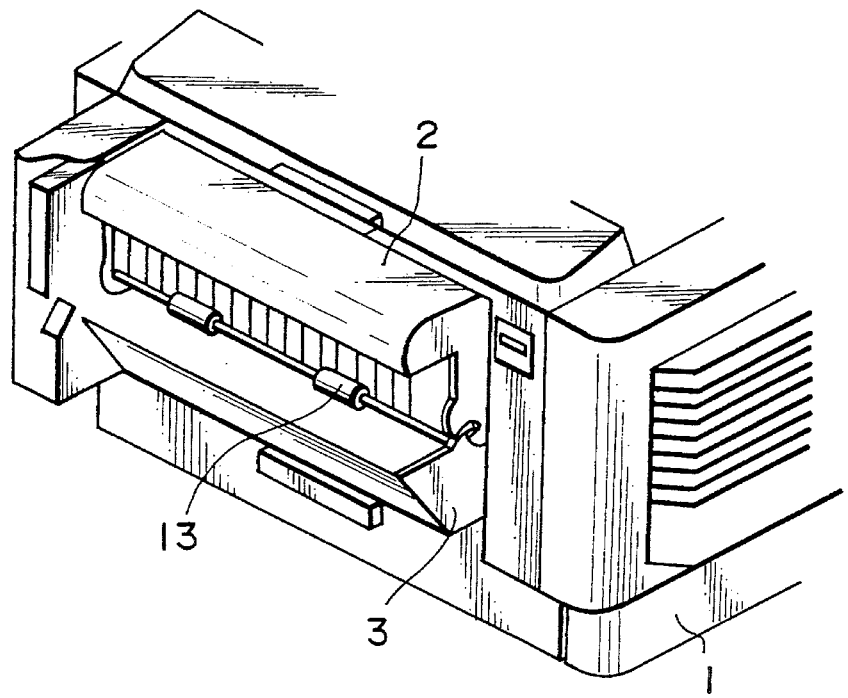
FIGS. 2A and 2B are perspective views showing a transport unit included in the embodiment in a closed position and an open position, respectively.
Figure 2B:
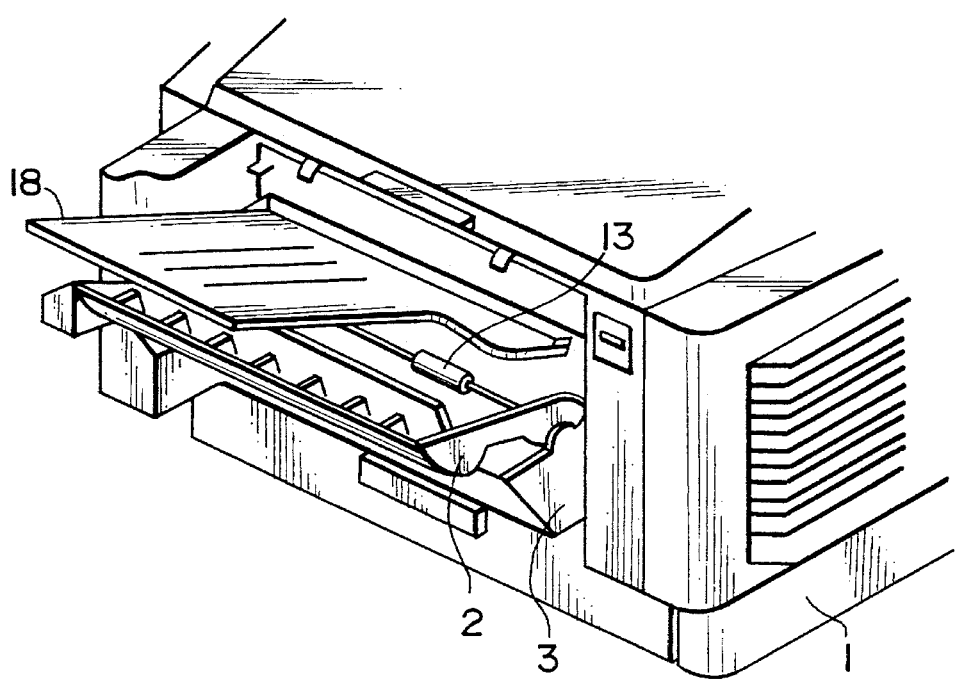

FIG. 2A shows the transport unit 2 mounted on the apparatus 1 in an operative position, i.e., in a closed position. In this condition, sheets sequentially coming out of the apparatus 1 are received by the holder 3 via the interior of the transport unit 2 and the conveyor roller 13. FIG. 2B shows the transport unit 2 brought to an inoperative or open position by being rotated about the shaft 13a. In this case, a horizontal tray 18 is attached to the apparatus 1 to receive sheets coming out of the apparatus 1. At this instant, since the holder 3 is still held in the closed position as shown in FIG. 2A, sheets are prevented from falling despite the opening of the transport unit 2. As should be readily apparent, different shapes are possible for the shell or housing of the transport unit 2, as shown by the different shapes depicted in FIGS. 1, 2A and 2B.

The torque limiter 16 shown in FIG. 1 prevents more than a predetermined number of sheets from being received in the holder 3. Hence, when sheets cannot be taken out despite that the facsimile apparatus 1 may receive a great amount of data, e.g., when the user is to be away on vacation, the transport unit 2 may be opened and the horizontal tray 18 may be mounted instead.

Figure 3:
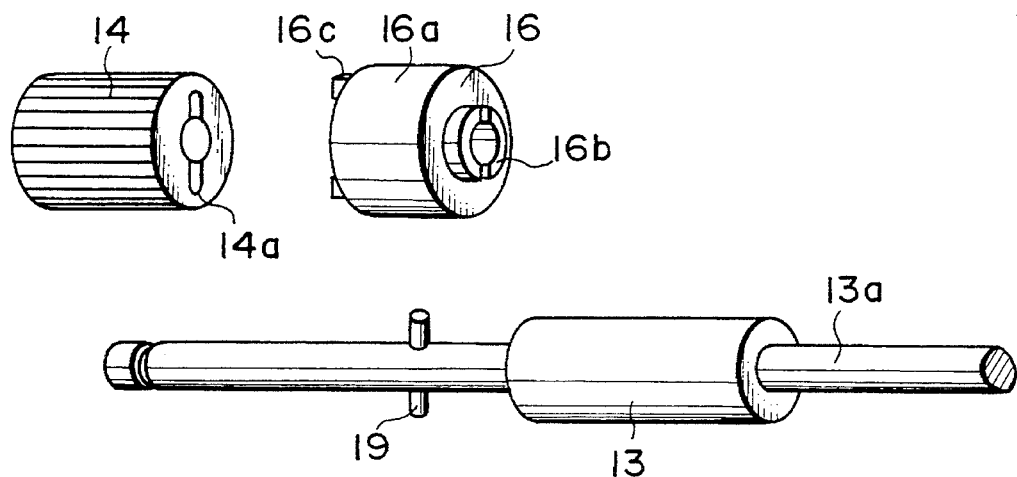
FIG. 3 is a perspective view showing a specific construction of a torque limiter included in the embodiment.

FIG. 3 shows a specific construction of the torque limiter 16. As shown, the torque limiter 16 has a housing 16a provided with pawls 16c, and an annular member 16b received in the housing 16a and rotatable along with the housing 16a under predetermined friction. The shaft 13a of the transport roller 13 is passed through the annular member 16b and positioned by a pin 13b studded on the shaft 13a. The conveyor roller gear 14 is mounted on and rotatable relative to the shaft 13a. In this configuration, the rotation of the gear 14 is not directly transmitted to the shaft 13a, but transmitted by way of the torque limiter 16. Specifically, as the pawls 16c of the housing 16a are received in recesses 14a formed in the gear 14, the rotation of the gear 14 is transmitted to the torque limiter 16. The rotation of the torque limiter 16 is transmitted to the shaft 13a via the annular member 16b and pin 13b engaged with the member 6b. As a result, the conveyor roller 13 follows the rotation of the torque limiter 16.

When the load acting on the conveyor roller 13 due to the contact of the roller 13 and sheet stack increases to a predetermined level, a force acts on the annular member 16b of the torque limiter 16 to cause it to stop rotating. As this force exceeds the predetermined frictional force (set torque) causing the annular member 16b to follow the rotation of the housing 16a, the member 16b is brought to a stop while only the housing 16a rotates along with the gear 14. Therefore, if the set torque of the torque limiter 16 is selected on the basis of the number of sheets to be stacked, the conveyor roller 13 will automatically stop rotating when such a number of sheets are stacked. This prevents an excessive number of sheets from being received in the holder 3, FIG. 1, and protects sheets from damage ascribable to the roller 13.

Details regarding the drive or gear couplings for the rollers are omitted from FIGS. 1, 2A, 2B and 4 (which is discussed hereinafter) for clarity. An example of a suitable drive is discussed hereinafter with reference to FIG. 5.

Figure 4:
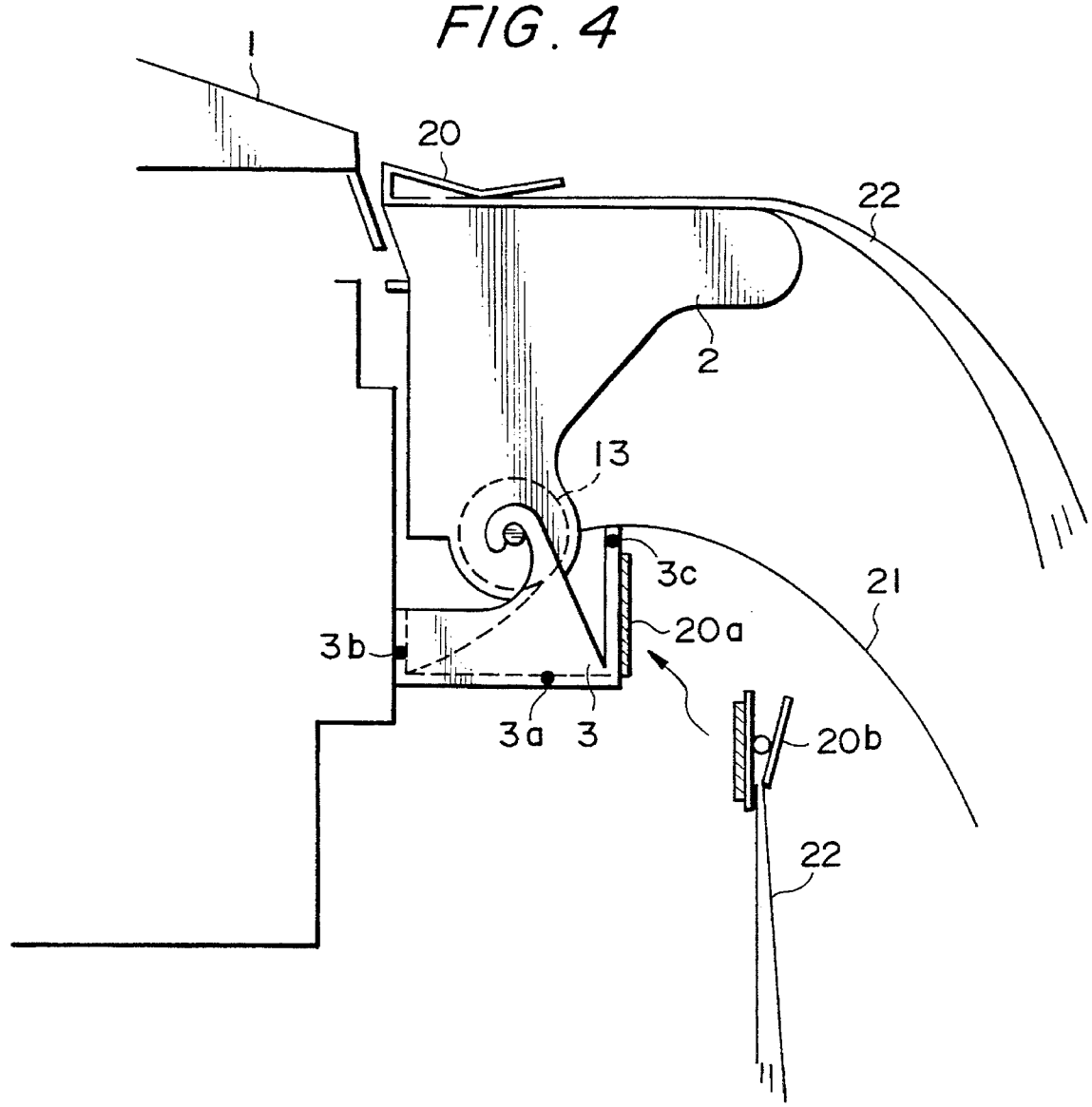
FIG. 4 is a side elevation of a second embodiment of the present invention.

A second embodiment of the present invention will be described with reference to FIG. 4. As shown, a clip 20 is provided on the top of the transport unit 2 for clipping sheets removed from the holder 3. A sheet 21 driven out of the facsimile apparatus 1 is moved into the holder 3 by the transport unit 2. The sheet 21 is received in the holder 3 with the trailing edge portion thereof hanging from the holder 3. Specifically, in the holder 3, the sheet 21 abuts against the corner between a bottom plate 3a and a left fence 3b at the leading edge thereof, bends in contact with a right fence 3c, and remains in contact with the transport roller 13. The sheet 21 is held in such a position due to the elasticity thereof. i.e., it is not forcibly held by an extra member. Hence, the sheets 21 stacked on the holder 3 will come out easily only if pulled upward manually. The operator, therefore, may separate printings addressed to him and then clip the other printings with the clip 20. If desired, a commercially available magnet clip 20b may be fitted on a steel plate 20a adhered to the front end of the holder 3 so as to clip the printings other than those addressed to the operator.

Figure 5:
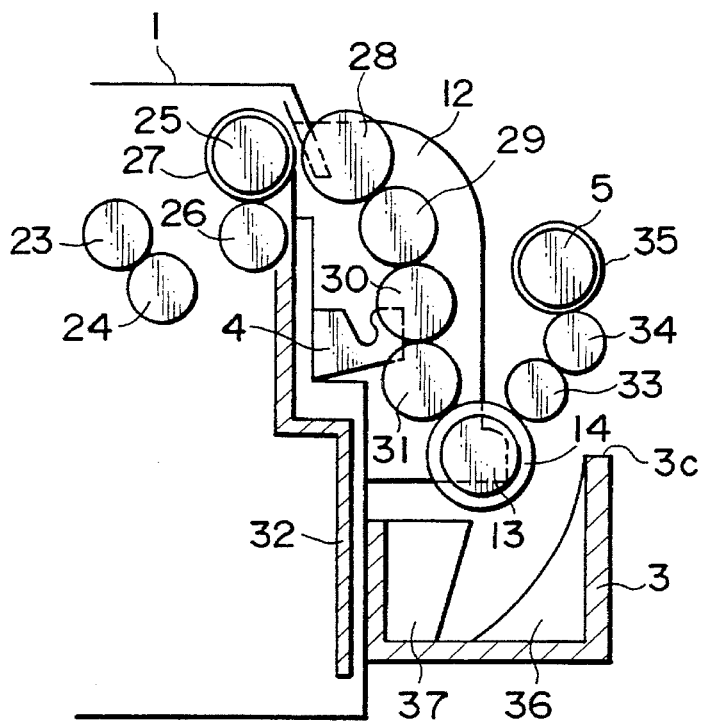
FIG. 5 is a sectional side elevation showing a specific internal arrangement of the embodiment shown in FIG. 1.

FIG. 5 shows a specific construction of the sheet tray of FIG. 1. As shown, the facsimile apparatus 1 has a fixing roller 23 and a pressure roller 24 cooperating to fix an image formed on a sheet, and a discharge roller pair 25 and 26 for discharging the sheet. An output gear 27 is provided on the discharge roller 25. The sheet tray has an input gear 28 held in mesh with the output gear 27, and idler gears 29, 30 and 31 intervening between the input gear 28 and the conveyor roller gear 14 mounted on the shaft 13a. The idler gears 29, 30 and 31 are mounted on the drive bracket 12. The input gear 28 and drive bracket 12 are mounted on the side wall 32 of the apparatus 1. The shaft 13a of the conveyor roller 13 is journalled to the drive bracket 12 and a bracket (15, FIG. 1) affixed to the side wall 32 by stop rings or similar retaining members. The torque limiter 16, FIGS. 1 and 3, is mounted on the shaft 13a and brakes the conveyor roller 13, as stated earlier.

The conveyor roller gear 14 is held in mesh with an idler gear 33 which is, in turn, held in mesh with an idler gear 34. Such a gearing transmits the rotation of the gear 14 to a discharge roller gear 35. The discharge roller 5 is provided on the same shaft as the discharge roller gear 35. The gear 35 and roller 5 are mounted on the transport unit 2 shown in FIG. 1. To lock the transport unit 2 to the apparatus 1, the tray brackets 4 are used, as described previously. The tray brackets 4 are configured to mount a horizontal tray (18, FIG. 2) associated with the apparatus 1 as a standard part. In the illustrative embodiment, the holder 3 has a guide 36 and an abutment 37. As a sheet is introduced into the holder 3 by the conveyor roller 13, the guide 36 guides the leading edge of the sheet toward the apparatus 1, thereby causing the leading edge of the sheet to abuts against the abutment 37. As a result, the sheet is held in the holder 3 by the abutment 37 and the right fence 3c of the holder 3.

Figure 6:
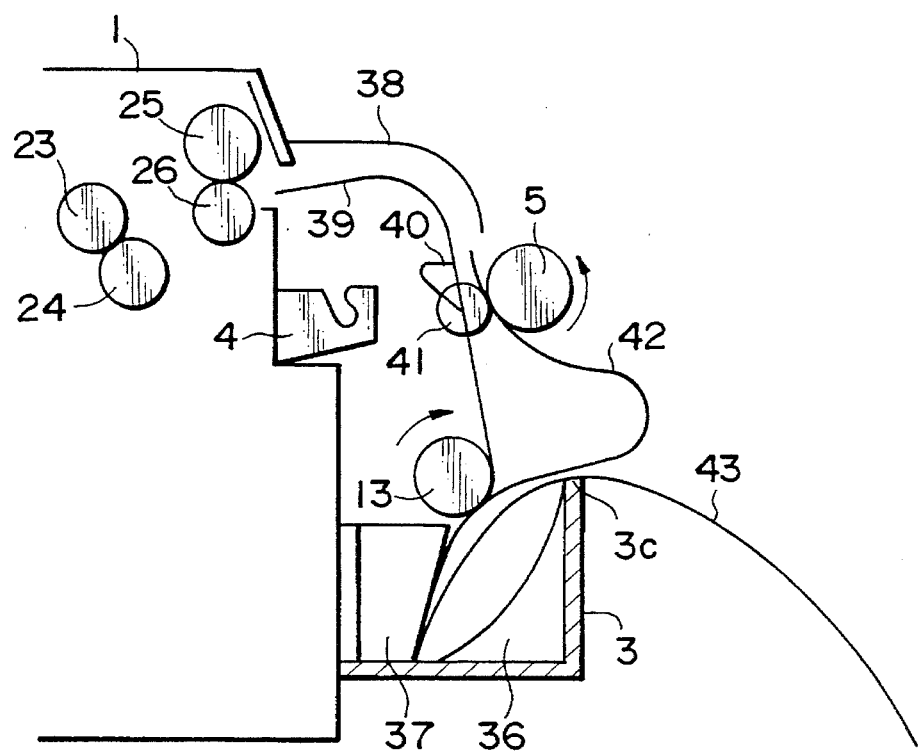
FIG. 6 is a sectional side elevation representative of the operation of the tray shown in FIG. 5.

The operation of this embodiment will be described with reference to FIG. 6. The gear drive arrangement of FIG. 5 is omitted from FIG. 6, and FIG. 6 includes upper and lower guides 38, 39 which are omitted from FIG. 5. In addition, the housing or shell of the transport unit 2 is omitted from FIGS. 5 and 6, such that FIG. 5 more clearly depicts the drive train, while FIG. 6 more clearly depicts the sheet feeding. To use the catch type sheet tray mounted on the apparatus 1, the transport unit 2, FIG. 1, is locked to the apparatus 1 by the tray brackets 4. A sheet moved away from the fixing roller 23 and pressure roller 24 of the apparatus 1 is driven out of the apparatus 1 by the discharge rollers 25 and 26. Then, an upper guide 38 and a lower guide 39 mounted on the transport unit 2 guide the sheet downward to the discharge roller 5. A roller 41 is constantly pressed against the discharge roller 5 by a leaf spring 40. The discharge roller 5 and roller 41 drive the sheet further downward via the conveyor roller 13. As a result, the sheet enters the holder 3 while being guided by the guide 36. Even after the leading edge of the sheet has abutted against the abutment 37 of the holder 3, the sheet is continuously driven by the discharge roller 5. As a result, the intermediate portion of the sheet sequentially bulges out from the holder 3, forming a loop. As soon as the trailing edge of the sheet is released from the discharge roller 5, it hangs down from the right fence 3c of the holder 3, as represented by a sheet 43. The sheet 43 is prevented from falling from the holder 3 since it abuts against the abutment 37, conveyor roller 13, and the right fence 3c of the holder 3 and since it is elastic.

In the same manner, the next and successive sheets have their leading edges brought to between the conveyor roller 13 and the sheet 43 stacked on the holder 3. Here, the prerequisite is that the coefficient of friction of the conveyor roller 13 be greater than that of the sheets. Under this condition, the following sheets are sequentially received in the holder 3 in contact with the abutment 37.

The load acting on the conveyor roller 13 increases with the increase in the number of sheets 43 stacked on the holder 3. As the load reaches the set idle torque of the torque limiter 16, FIG. 3, the torque limiter 16 brakes the conveyor roller 13 although the conveyor roller gear 14 continuously rotates. In this manner, if the set torque of the torque limiter 16 is selected on the basis of the number of sheets to be stacked together, the roller 13 automatically stops rotating when such a number of sheets are stacked. This prevents the leading edge of an incoming sheet from advancing beyond the point where the roller 13 and the stacked sheets 43 contact each other. On the other hand, the roller gear 14 and, therefore, the discharge roller 5 is continuously rotating. Hence, even after the conveyor roller 13 has stopped rotating, the incoming sheet is driven by the discharge roller 5. As a result, this sheet drops, from the leading edge to the trailing edge, without being stacked on the holder 3. This prevents more than a predetermined number of sheets 43 from being stacked in the space defined by the holder 3 and conveyor roller 13. It follows that a jam due to the excessive number of sheets 43 is eliminated which would otherwise cause received facsimile data to be lost.

In the holder 3, the sheets 43 are not forcibly retained by an extra member, but they are held due to their inherent elasticity, as stated earlier. Hence, the sheets 43 will come out easily only if pulled upward manually. When a great number of sheets are expected to be driven out of the apparatus 1, the transport unit, FIG. 2, will be opened and replaced with the horizontal tray 18 in the previously described manner. However, if the conveyor roller gear 14, FIG. 5, is continuously rotated despite the opening of the transport unit 2, the conveyor roller 13 and discharge roller 5 are apt to produce noise and even harm the operator due to their rotation. A specific drive mechanism capable of eliminating this problem will be described with reference to FIGS. 7A and 7B.

Figure 7A:
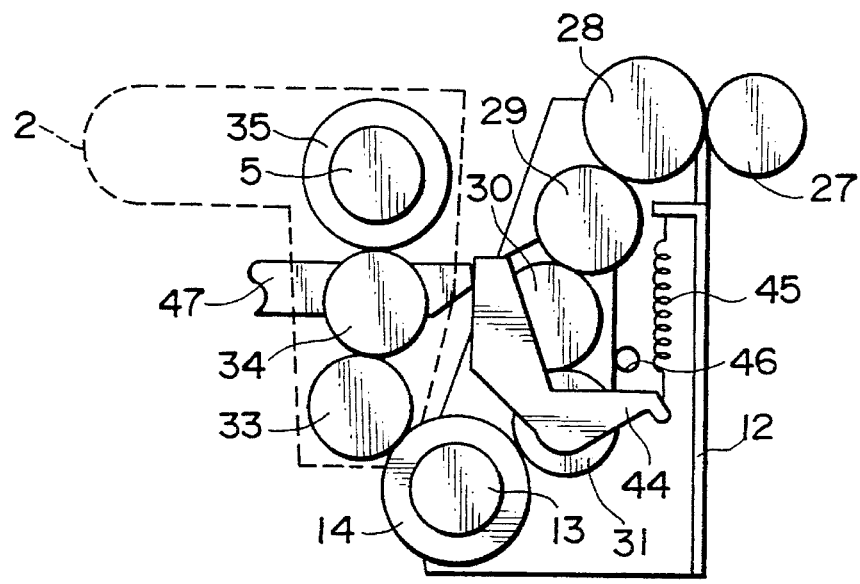
FIGS. 7A and 7B are sectional side elevations showing a specific drive mechanism included in the tray of FIG. 1.
Figure 7B:
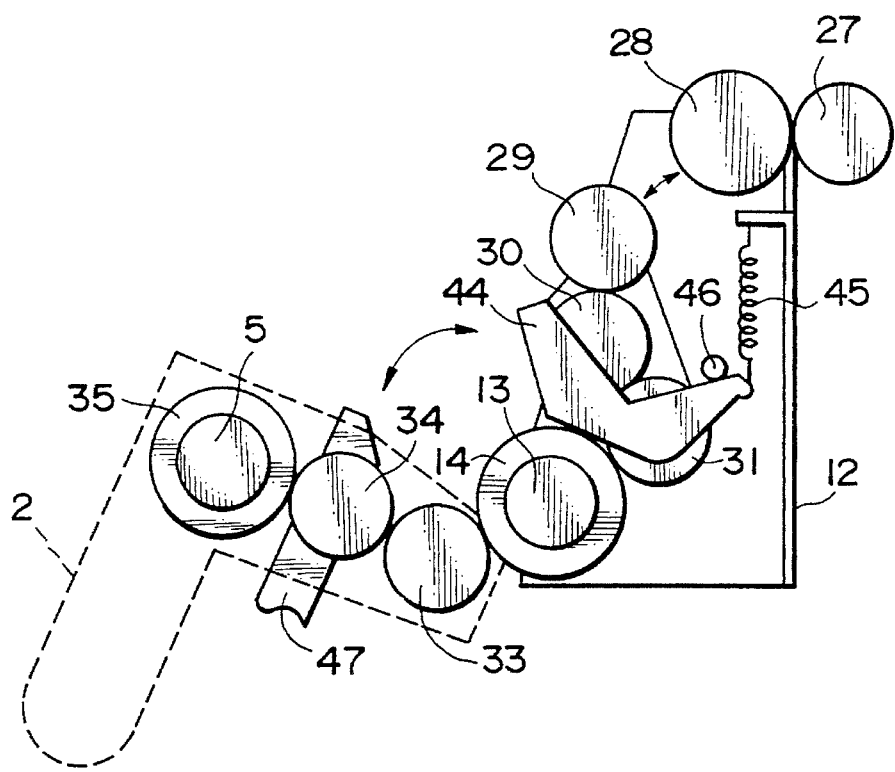

The drive mechanism shown in FIGS. 7A and 7B brakes the conveyor roller 13 and discharge roller 5 when the transport unit 2 is opened. As shown, the input gear and idler gears 29–31 are mounted on the drive bracket 12 of the tray while the conveyor roller gear 14 is mounted on the same shaft as the conveyor roller 13. Specifically, the idler gears 29 and 30 are supported by a drive arm 44 which is rotatable about the shaft of the idler gear 31. A tension spring 45 is anchored at one end to the drive arm 44 and at the other end to the drive bracket 12. When the transport unit 2 is in the open position, the drive arm 44 is biased by the spring 45 to a position where it abuts against a guide pin 46. Provided on the transport unit 2 are the idler gears 33 and 34 to be driven by the gear 14, the discharge roller gear 35 coaxial with the discharge roller 5, and a lever 47 for pressing the drive arm 44 when the unit 2 is in the closed position. The drive arm 44, spring 45, guide pin 46 and lever 47 constitute a second brake section.

FIGS. 7A and 7B show the transport unit 2 in the closed position and the open position, respectively. In FIG. 7A, the transport unit 2 is locked to the apparatus 1 while the drive arm 44 is pressed by the lever 47. As the drive arm 44 is pressed by the lever 47, it is rotated about the shaft of the idler gear 31 with the result that the idler gear 29 is brought into mesh with the input gear 28. In this condition, the rotation of the output gear 27 of the apparatus 1 is transmitted to the conveyor roller gear 14, which is coaxial with the conveyor roller 13, via the input gear 28 and idler gears 29–31. At the same time, the rotation of the gear 14 is transmitted to the discharge roller gear 35, which is coaxial with the discharge roller 5, via the idler gears 33 and 34.

As shown in FIG. 7B, when the transport unit 2 is opened, the force of the lever 47 acting on the drive arm 44 is cancelled. Hence, the drive arm 44 is rotated about the shaft of the idler gear 31 by the spring 45 until it abuts against the guide pin 46. As a result, the idler gear 29 is released from the input gear 28 to interrupt the drive transmission from the output gear 27 to the conveyor roller gear 14 and other gears. In this manner, when the transport unit 2 is opened, the idler gears 29–31, conveyor roller gear 14, idler gears 33 and 34 and discharge roller gear 35 stop rotating.

As stated above, when the transport unit 2 is opened, the gear train of the tray automatically stops rotating and, therefore, does not generate noise or injure the operator.

Figure 8:
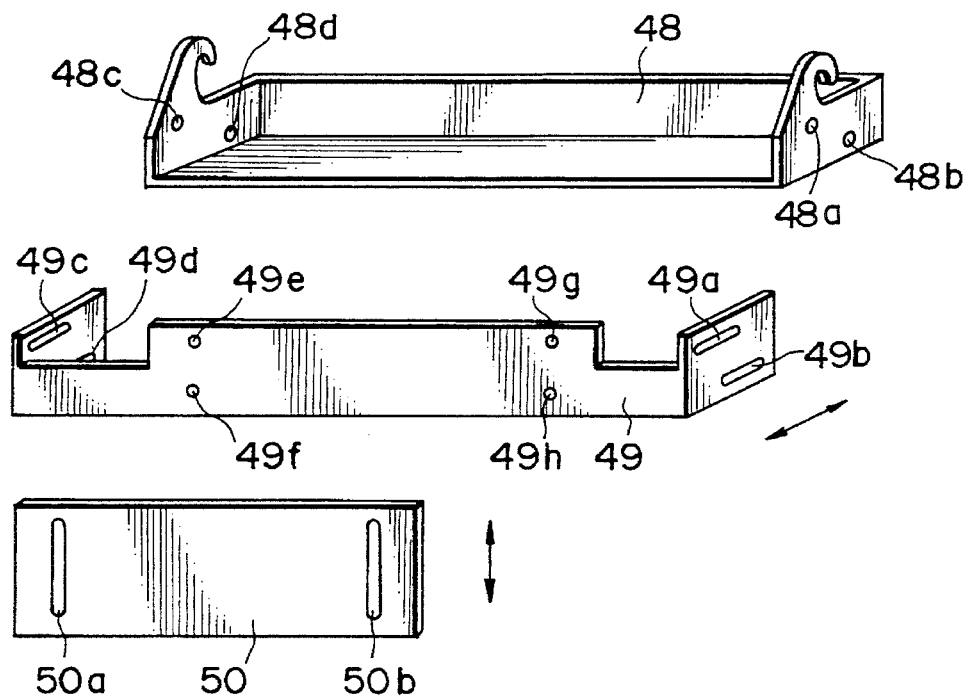
FIG. 8 is an exploded perspective view showing a specific construction of a holder applicable to the present invention.

FIG. 8 shows a specific configuration of the holder included in the embodiment. As shown, the holder has a base or casing 48, a slidable side plate 49, and a height adjusting plate or height adjuster 50. The side plate 49 and height adjuster 50 are individually movable to positions matching a desired number of sheets to be stacked. Specifically, the base 48 is formed with threaded holes 48a–48d for fastening the side plate 49. The side plate 49 is formed with slots 49a–49d. When the side plate 49 is to be fastened to the holder base 48 through the threaded holes 48a–48d, it can be adjusted in position within the range of the slots 49a–49d. The side plate 49 is provided with holes 49e–49e for fastening the height adjuster 50. The height adjuster 50 is formed with slots 50a and 50b, so that its position can be adjusted within the range of the slots 50a and 50b. With the holder shown in FIG. 8, it is possible to change the number of sheets to be stacked in matching relation to the kind and size of sheets to be used.

While the illustrative embodiments described so far have the gears and rollers thereof driven by the facsimile apparatus 1, an exclusive drive source may be built in the tray, as will be described with reference to FIG. 9.

Figure 9:
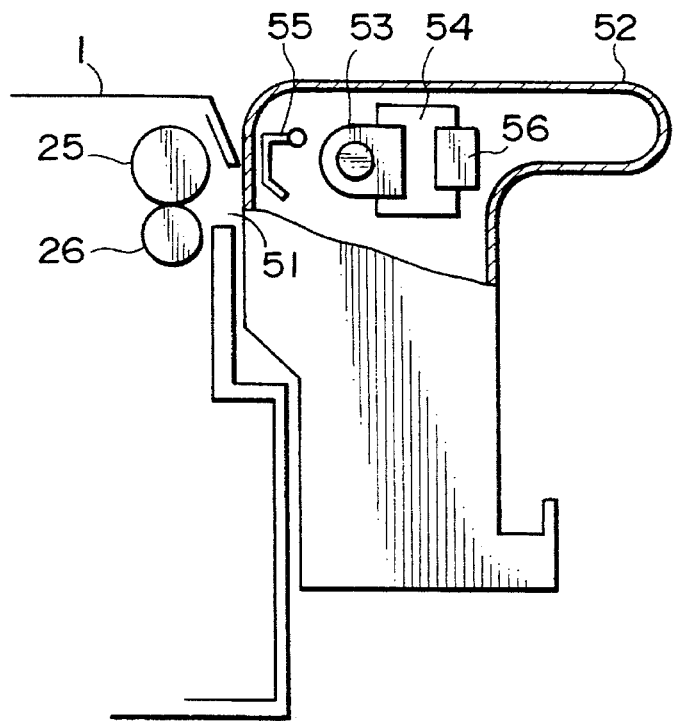
FIG. 9 is a sectional side elevation showing a third embodiment of the present invention.

FIG. 9 shows a third embodiment of the present invention. As shown, a catch type sheet tray, generally 52, has a motor 53, a power source 54 for driving the motor 53, a sheet sensor 55 responsive to a sheet coming out of the facsimile apparatus 1, and a control unit 56 for controlling a drive line, including the motor 53, in response to the output of the sheet sensor 55. The sheet sensor 55 and control unit 56 constitute a start-up control section in combination. In operation, as the sheet sensor 55 senses a sheet coming out through the outlet 51 of the apparatus 1, the control unit 56 feeds a current from the power source 54 to the motor 53 so as to rotate it. The rotation of the motor 53 is transferred to various gears, not shown. As a result, the discharge roller and conveyor roller, not shown, are rotated to transport the sheet until the sheet has been received in the holder.

Figure 10:
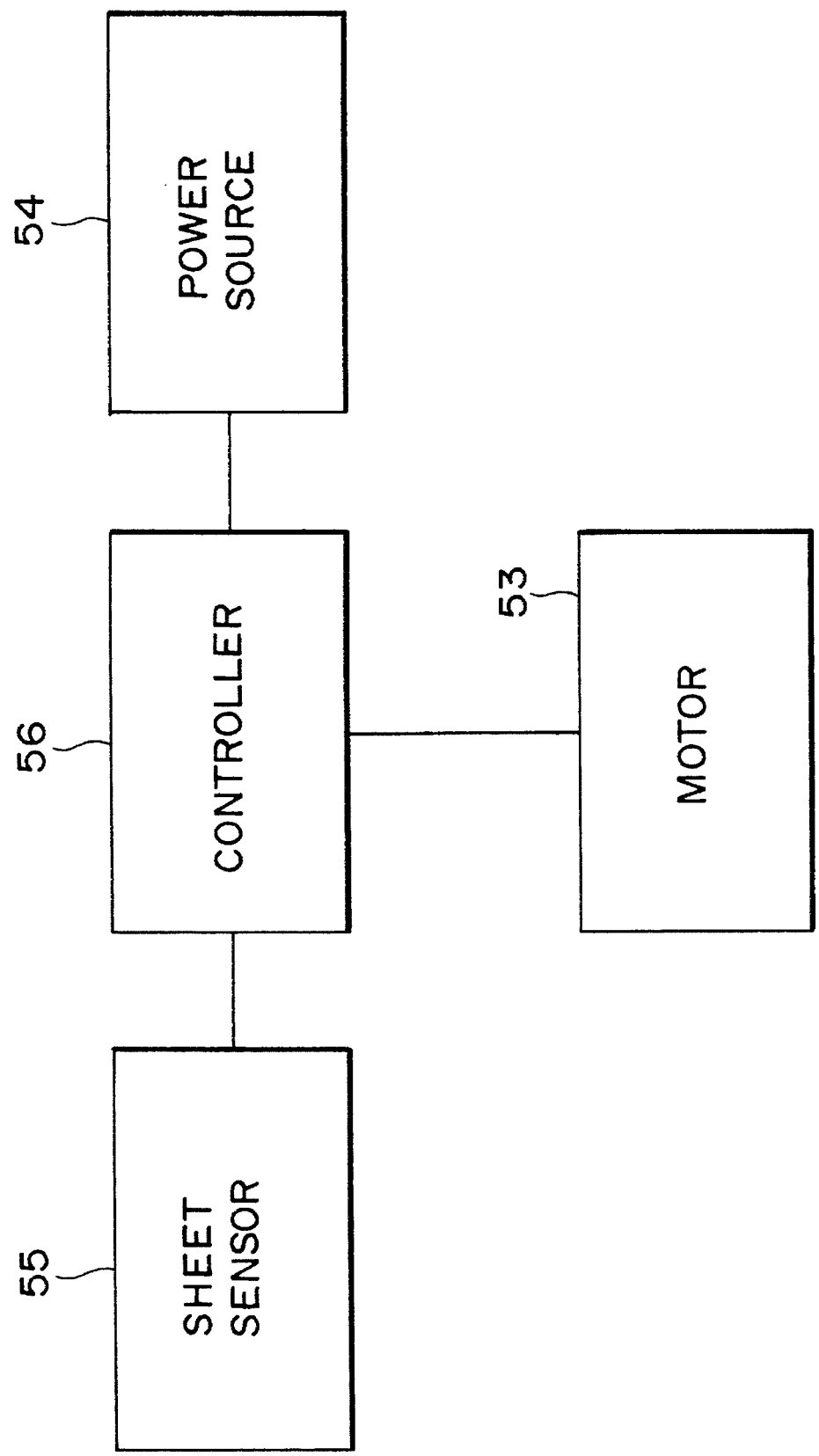
FIG. 10 is a block diagram schematically showing a control system included in the embodiment of FIG. 9.

FIG. 10 shows a specific system for controlling the drive line of FIG. 9. As shown, the control unit 56 constantly monitors the output of the sheet sensor 55. When the sheet sensor 55 senses the leading edge of a sheet coming out through the outlet 51 of the apparatus 1, the control unit 56 feeds a current from the power source 54 to the motor 53. As a result, the motor 53 is rotated to cause the tray, including the drive line of FIG. 9, to receive the sheet. When the sheet sensor 55 does not sense the next sheet within a predetermined period of time, the control unit 56 interrupts the current supply from the power source 54 to the motor 53, thereby deenergizing the motor 53.

The embodiments described above have various advantages, as enumerated below.

(1) Since the sheet tray is removably mounted on the facsimile body, it can be replaced with the horizontal tray, depending on the installation condition of the facsimile body.

(2) When the number of sheets stacked on the sheet tray reaches a predetermined limit, the transport roller for holding sheets automatically stops rotating. This protects sheets from damage and prevents an excessive number of sheets from being introduced into the tray.

(3) The operator is allowed to separate printings addressed to him and preserve the other printings independently of printings to be driven out of the facsimile body later. Hence, the printings are stacked with ease. Particularly, when the printings other than those addressed to the operator are held by, for example, a clip, they can be held surely and easily while saving space. (4) The tray can be opened and closed without changing the distance between the shafts included in the drive line. The operator, therefore, can remove a sheet jamming the facsimile body or use the horizontal tray by a single operation.

(5) When the tray is opened to, for example, remove a jamming sheet, the gears and rollers incorporated therein stop rotating and do not injure the operator.

(6) Since sheets are caught by the sheet tray due to their inherent elasticity, the operator can take them out easily.

(7) The tray is simplified when driven by a drive source included in the facsimile body. When an exclusive drive source is built in the tray, the control over the operation of the tray is simple and reliable. For example, the exclusive drive source may be selectively turned on or turned off depending on whether or not a sheet has been discharged from the facsimile body.

(8) The holder for receiving sheets is adjustable in size. This allows the number of sheets to be received in the holder to be changed in matching relation to the kind and size of sheets to be used.

However, the embodiments described so far have some problems, as follows. Assume that the sheets introduced into the catch type sheet tray are curled or of relatively small size, e.g., A5 or B5. Then, the trailing edges of the sheets are apt to stand upright, instead of hanging down from the tray, obstructing a sheet to follow. The conveyor roller automatically stops rotating when a predetermined number of sheets are stacked on the tray, as stated earlier. At this instant, it is likely that the leading edge of the following sheet fails to enter the point of contact of the conveyor roller and the sheet stack accurately due to, among others, the friction between the roller and the sheet. Then, the leading edge of the following sheet will abut against the sheet stack and conveyor roller in an unstable condition, causing the sheet to collapse before the trailing edge thereof is discharged. Alternative embodiments of the present invention which eliminate such problems will be described hereinafter. For clarity, elements such as the gear drives (e.g., as shown in FIG. 5) and certain rollers are omitted from FIGS. 11A, 11B, 12, 14–18, 21 and 24, thereby more clearly depicting the sheet feeding provided by the respective embodiments. As would be readily understood by those skilled in the art, suitable drives or gear couplings can be utilized for the rollers throughout the various embodiments.

Figure 11A:
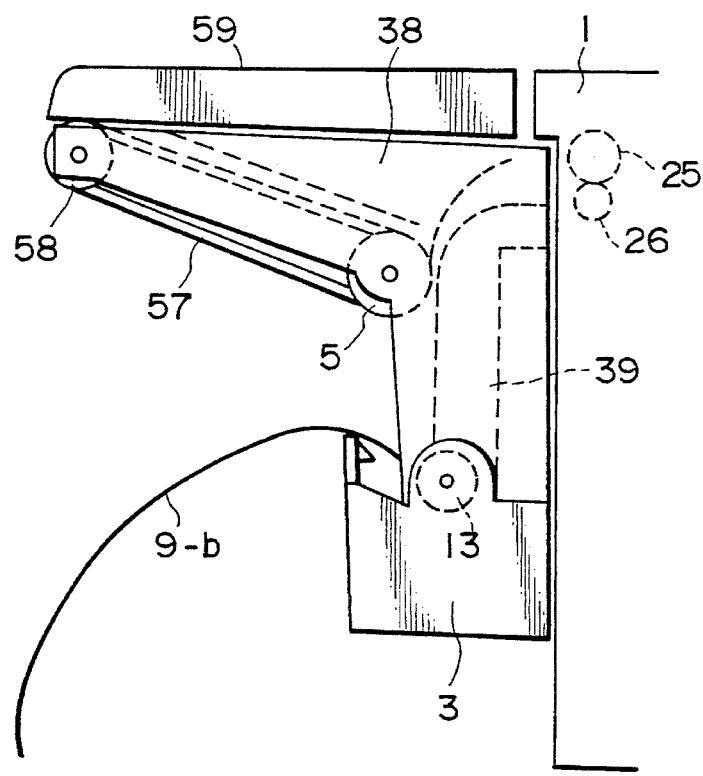
FIGS. 11A and 11B are side elevations showing a fourth embodiment of the present invention.
Figure 11B:
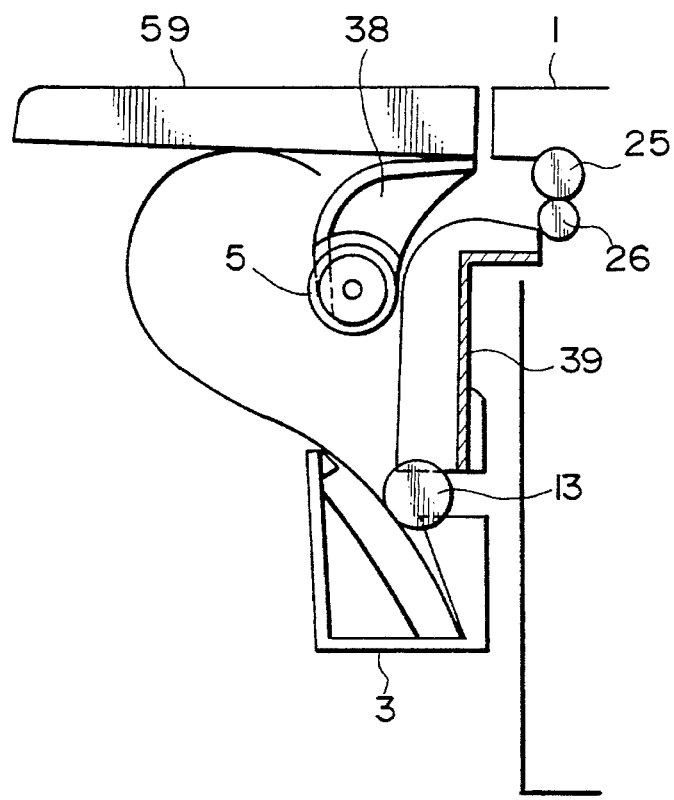

FIGS. 11A and 11B show a fourth embodiment of the present invention. As shown in FIG. 11A, a catch type sheet tray has a discharge belt 57 and a pulley 58 in addition to the constituent parts of any one of the first to third embodiments. The discharge belt 57 plays the role of a trailing edge drive section and comprises an expansible friction member. A sheet driven out of the facsimile apparatus 1 by the discharge rollers 25 and 26 is driven by the discharge roller 5 vertically downward by the upper guide 38 and lower guide 39. While the leading edge of the sheet is held by the holder 3, the trailing edge 9-*b* hangs down due t o gravity. FIG. 11B illustrates what would occur if the discharge belt 57 were absent. As shown, when the sheet is noticeably curled due to the ambient conditions or due to the relatively small size, e.g., A5or B5, the trailing edge of the sheet is caught by a document table 59 or similar member when driven out by the discharge roller 5. Specifically, the sheet discharged by the discharge roller 25 is guided downward by the upper guide 38 and lower guide 39 and brought to the abutment of the holder 3 via the conveyor roller 13. Since the sheet is further driven by the discharge roller 25, the sheet noticeably curled or small size has the trailing edge thereof caught by the overlying document table or stands upright at the trailing edge.

Figure 12:
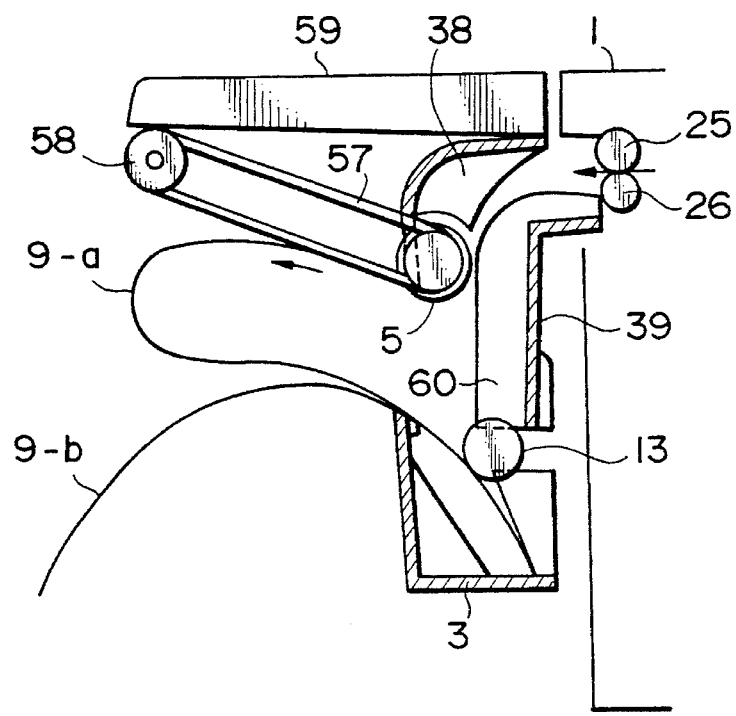
FIG. 12 is a sectional side elevation showing a fifth embodiment of the present invention.

How the discharge belt 57 shown in FIG. 11A drives the trailing edge of a sheet will be described with reference to FIG. 12. Specifically, FIG. 12 shows a fifth embodiment of the tray in accordance with the present invention. As shown in FIG. 11A, an elastic Mylar sheet 60 is adhered to the lower guide 39 to guide the trailing edge of a sheet. In a sheet tray of the type concerned, it is likely that the transport roller 13 and lower guide 39 are dislocated relative to each other due to inaccurate assembly, causing the leading edge of a sheet to enter the gap therebetween or causing it to be discharged to a position remote from the roller 13. In this embodiment, the Mylar sheet 60 is held in contact with the conveyor roller 13 to surely guide a sheet into the holder 3. Further, when the conveyor roller 13 stops rotating due to the stack of a predetermined number of sheets in the holder 3, the Mylar sheet 60 surely guides the leading edge of the following sheet to the point where the roller 13 and the stack contact each other.

In operation, a sheet driven out by the discharge roller 25 of the facsimile apparatus 1 is guided downward by the upper and lower guides 38 and 39 to the discharge roller 5. The discharge roller 5 in rotation drives the sheet further downward until the leading edge of the sheet abuts against the abutment of the holder 3 via the conveyor roller 13. As the discharge roller 5 continuously drives the trailing edge of the sheet, the intermediate portion of the sheet bulges out, as represented by a sheet 9-*a*. At this instant, the intermediate portion of the sheet 9-*a* contacts the discharge belt 57 which is passed over the discharge roller 5 and a pulley 58. As a result, as the discharge roller 5 rotates, the belt 57 moves the intermediate portion and trailing edge of the sheet in the discharge direction, as indicated by an arrow in FIG. 12.

As stated above, the discharge belt 57 forcibly drives the trailing edge of a sheet in the discharge direction and, therefore, allows the sheet to be surely held in the holder 3 even when it is noticeably curled or is of relatively small size. e.g., A5or B5.

Moreover, the Mylar sheet 60 guides the leading edge of a sheet 9-*b* to the abutment of the holder 3. Subsequently, as the next sheet 9-*a* arrives at the portion of the holder 3 where the sheet 9-*b* exists, the Mylar sheet 60 surely guides the leading edge of the sheet 9-*a* to between the conveyor roller 13 and the sheet 9-*b*. This prevents the leading edge of the sheet 9-*a* pressed against the lower guide 39 by the discharge roller 5 from abutting against the sheet 9-*b* held in the holder 3; otherwise, the sheet 9-*a* would fail to enter the gap between the conveyor roller 13 and the sheet 9-*b* and collapse.

Figure 13:
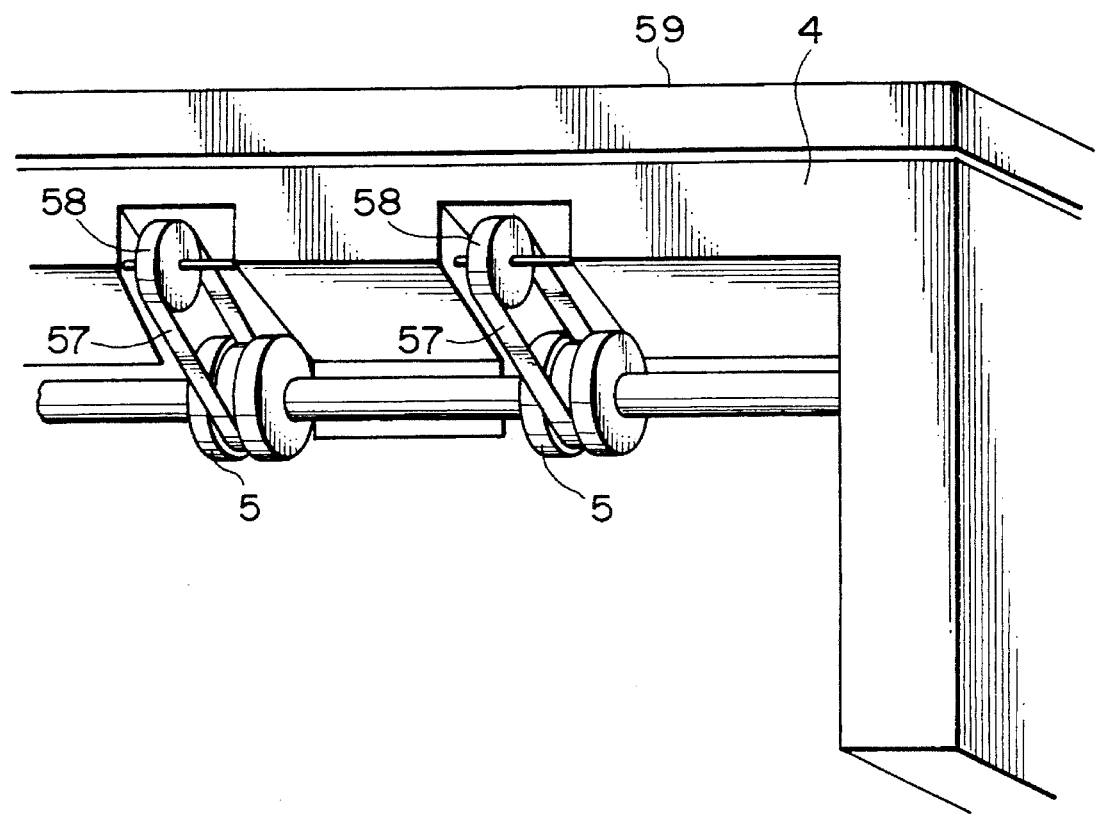
FIG. 13 is a perspective view showing a portion of the fifth embodiment arranged to drive the trailing edge of a sheet specifically.

The part of the tray of FIG. 12 for driving the leading edge of a sheet is shown in FIG. 13 specifically. As shown, the discharge roller 5 has a plurality of roller portions each being formed with a pully-like annular recess. The discharge belt 57 is passed over the associated annular recess or pulley. The pulley 58 is supported by the upper guide, or base, 38. One or more discharge belts 57 extend from the associated discharge rollers 5 in the discharge direction. Such belts 57 are implemented as expansible friction members and forcibly drive the trailing edge of a sheet in the discharge direction. In this configuration, a sheet is prevented from being caught by the document table 59 or from standing upright at the trailing edge thereof.

Figure 14:
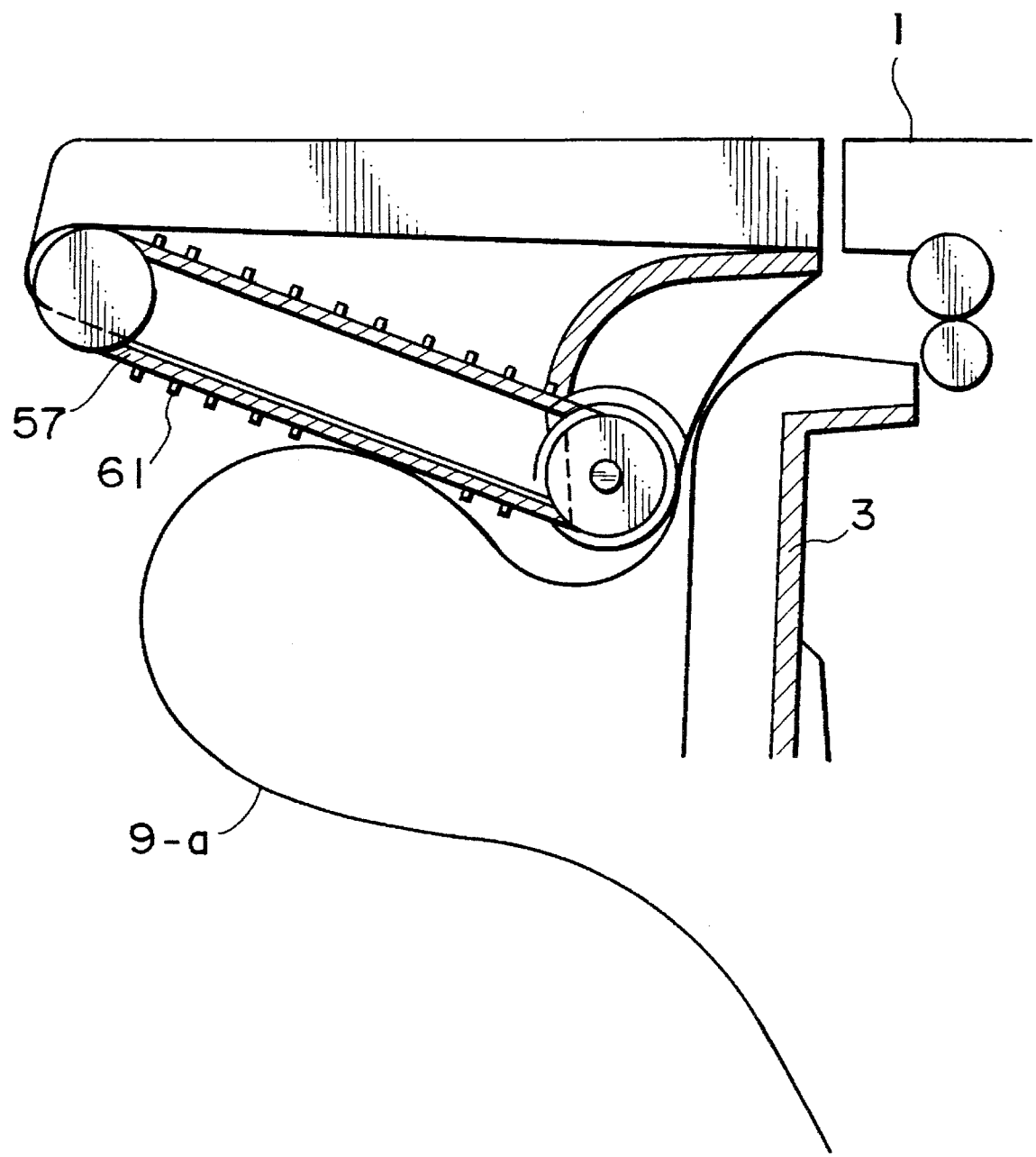
FIG. 14 is a sectional side elevation of a sixth embodiment of the present invention.

Referring to FIG. 14, a sixth embodiment of the present invention will be described which is essentially similar to the fifth embodiment. FIG. 12, except for the configuration of the discharge belt 57. As shown, the discharge belt 57 is formed with a plurality of spaced projections 61 for driving the trailing edge of a sheet. The belt 57 with such projections 61 exerts a more intense frictional force on the sheet 9-*a* than the belt 57 of FIG. 12, thereby discharging the sheet more stably.

The fourth to sixth embodiments described above have various advantages, as enumerated below.

(1) The belt or belts 57 forcibly drive a sheet in the discharge direction. This prevents the sheet from standing upright or from being caught by the document table 59 and, therefore, allows the leading edge of the sheet to hang down easily.

(2) Since the belts 57 are implemented as friction members, they are capable of discharging the trailing edge of a sheet more positively.

(3) Since the belts 57 are expansible, they cause a sheet to slip little.

(4) The spaced projections 61 on the belts 57 further promote the positive discharge of the trailing edge of a sheet.

(5) The belts 57 are passed over the same shaft as the discharge roller 5 and, therefore, can be driven without resorting to an exclusive drive mechanism or drive source.

(6) The Mylar sheet 60 extends from the guide 39 toward the point where the sheet held in the holder 3 and the conveyor roller 13 contact. With the Mylar sheet 60, it is possible to surely guide the leading edge of an excess sheet to the contact point of the roller 13 and the sheet held by the holder 3 and, therefore, to cause the excess sheet to surely drop from the holder 3.

A seventh embodiment of the present invention will be described with reference to FIG. 15. This embodiment includes a holder 67 lacking the abutment against which the leading edge of a sheet abuts. Abutments 68 are provided on a facsimile apparatus 66. A transport unit 62 is provided with bosses 63 (only one is visible) while the holder 67 is formed with holes 64. The transport unit 62 and holder 67 are attached to each other with the bosses 63 and holes 64 mating with each other. In this condition, the transport unit 62 and holder 67 are rotatable relative to each other. The reference numeral 65 designates screws 65.

In the seventh embodiment, when the transport unit 62 is opened, it is apt to hit against the facsimile apparatus 66 or the holder 67 due to the weight thereof. Further, when the holder 67 fails to closely contact the apparatus 66, it cannot receive sheets accurately, as will be described with reference to FIG. 16.

Figure 15:
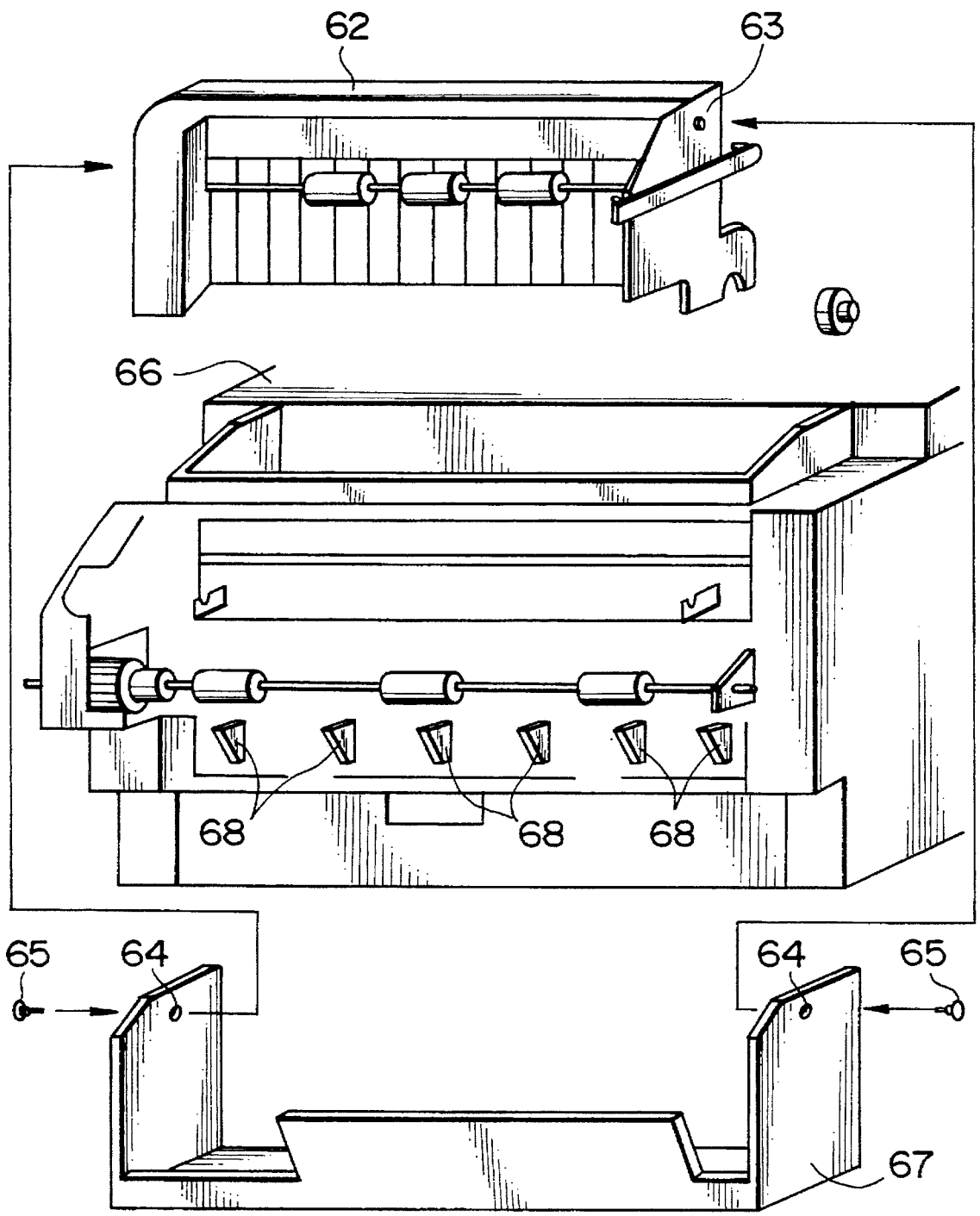
FIG. 15 is a perspective view of a seventh embodiment of the present invention.
Figure 16:
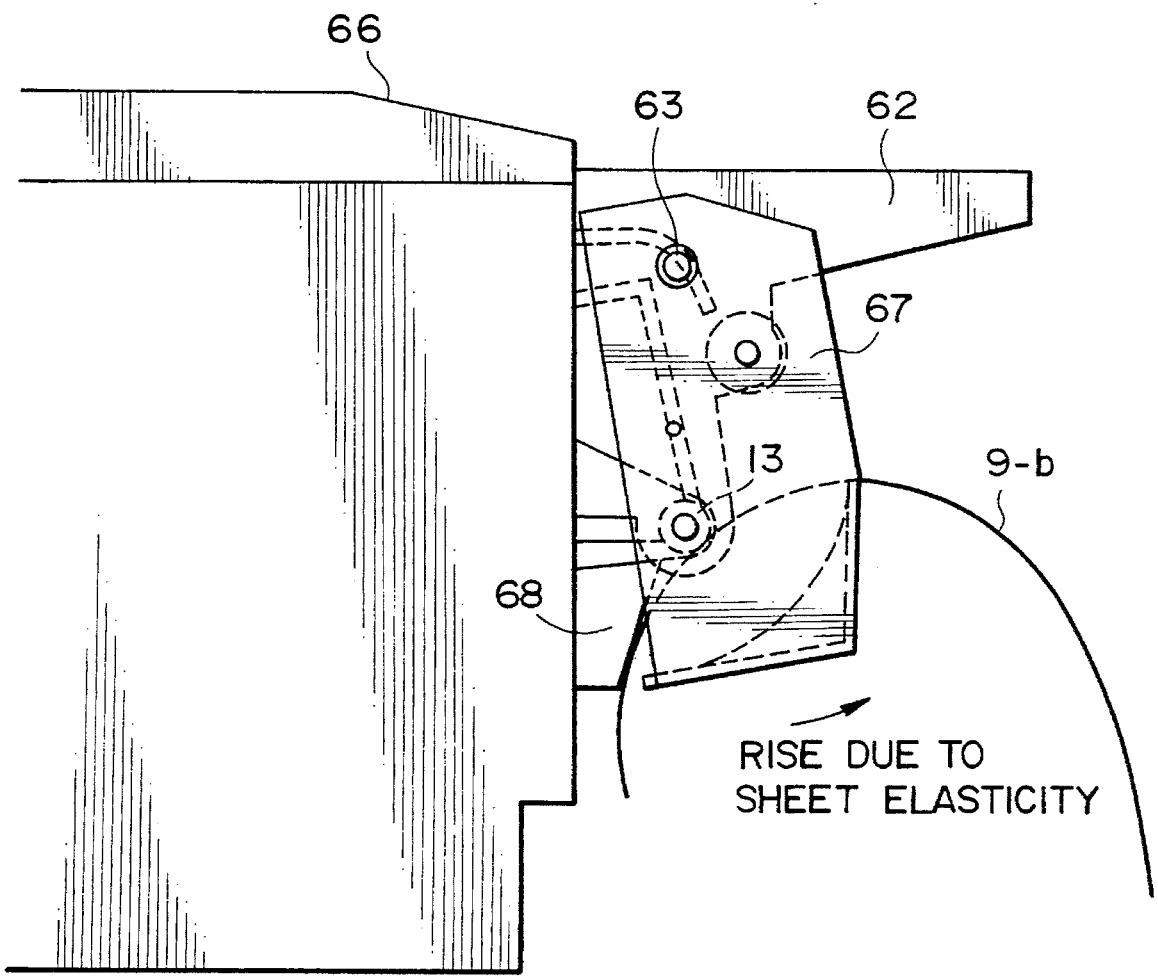
FIG. 16 is a section showing a specific condition wherein a sheet is received in the embodiment of FIG. 15.

FIG. 16 shows a specific condition wherein a sheet is received in the holder 67 of the embodiment of FIG. 15. As shown, the holder 67 is spaced apart from the apparatus 66 due to the elasticity of the sheet 9-b. As a result, the leading edge of the sheet 9-b has slipped out of the abutments 68 and protruded to the outside through the clearance between the holder 67 and the apparatus 66. In this condition, if the transport roller 13 is continuously rotated, the sheet 9-b will drop from the holder 67. An eighth embodiment which eliminates this problem will be described with reference to FIG. 17.

Figure 17:
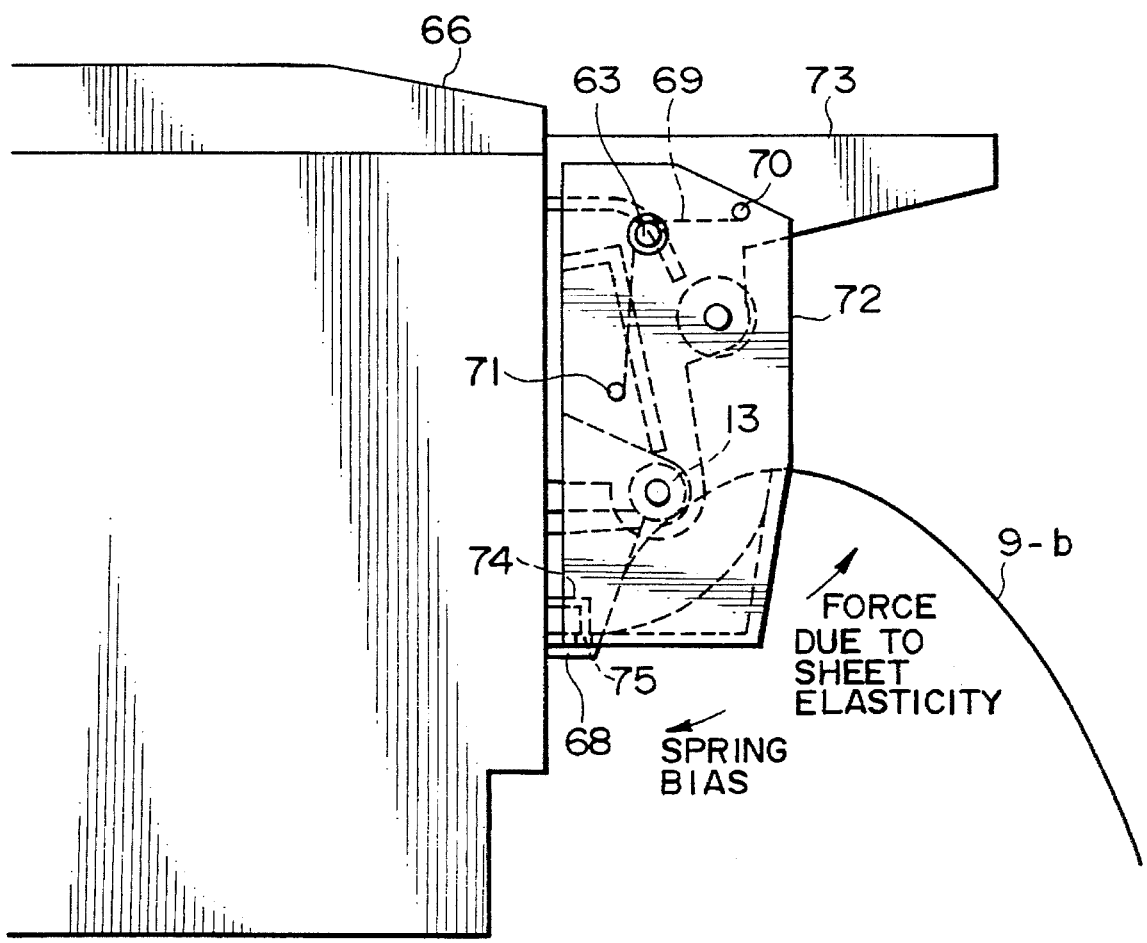
FIG. 17 is a side elevation of an eighth embodiment of the present invention.

As shown in FIG. 17, a holder 72 is constantly urged against the side of the apparatus 66 by a spring 69. Specifically, the spring 69 is fitted on the boss 63 of a transport unit 73 and anchored at one end to a hole formed in a transport unit 73 and at the other end to a hole 71 formed in the holder 72. In this condition, the holder 72 is held in close contact with the apparatus 66 while the sheet 9-b is surely abutted against the abutment 68 by the conveyor roller 13. Further, the apparatus 66 is provided with a hook 74. When the tray is in the operative position, a hole 75 formed in the holder 72 mates with the hook 74 to prevent the holder 72 from moving more positively. The spring 69 not only surely retains the holder 72 on the apparatus 66, but also damps a shock when the transport unit 73 is opened.

Figure 18:
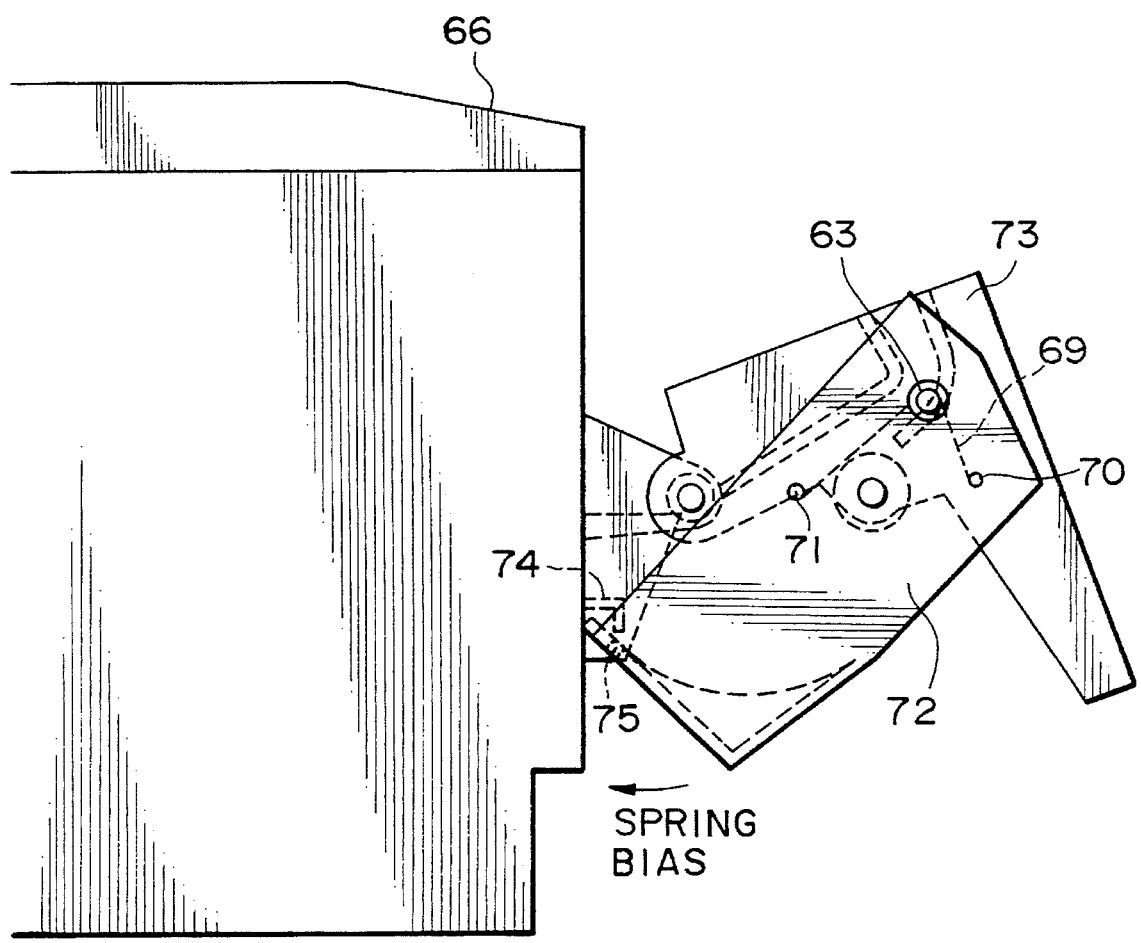
FIG. 18 is a side elevation showing a specific condition wherein the tray shown in FIG. 17 is opened.

FIG. 18 shows a specific condition wherein the transport unit 73 of the eighth embodiment is opened. As shown, as the transport unit 73 is rotated away from the apparatus 66, the spring 69 anchored to the unit 73 and holder 72 is twisted and, therefore, increases the repulsive force thereof. As a result, the force of the spring 69 cancels the force acting on the transport unit 73 in the opening direction, thereby damping a shock between the unit 73 and the holder 72 and apparatus 66. At the same time, since the hole 75 of the holder 72 is released from the hook 74 of the apparatus 6 6 easily, the holder 72 becomes free to move and allows, for example, a jamming sheet to be removed with ease. When the transport unit 73 is closed, the spring 69 causes the hook 74 of the apparatus 66 to surely mate with the hole 75 of the holder 72, thereby surely positioning the holder 72.

As described above, the seventh and eighth embodiments use the spring 69 as a member for pressing the holder against the facsimile apparatus 1 while damping a shock. This is successful in preventing the holder from moving away from the apparatus despite the elasticity of a sheet, and reducing a shock when the transport unit is opened. Hence, the leading end of a sheet is surely brought into abutment against and held by the holder, while the tray and facsimile apparatus are free from damage.

Regarding installation, the first to eighth embodiments described above save more space than the horizontal tray. However, when any one of the embodiments receives more than a predetermined number of sheets, it simply causes excess sheets to drop onto the floor. Other preferred embodiments to be described hereinafter constitute an improvement in this respect.

Figure 19:
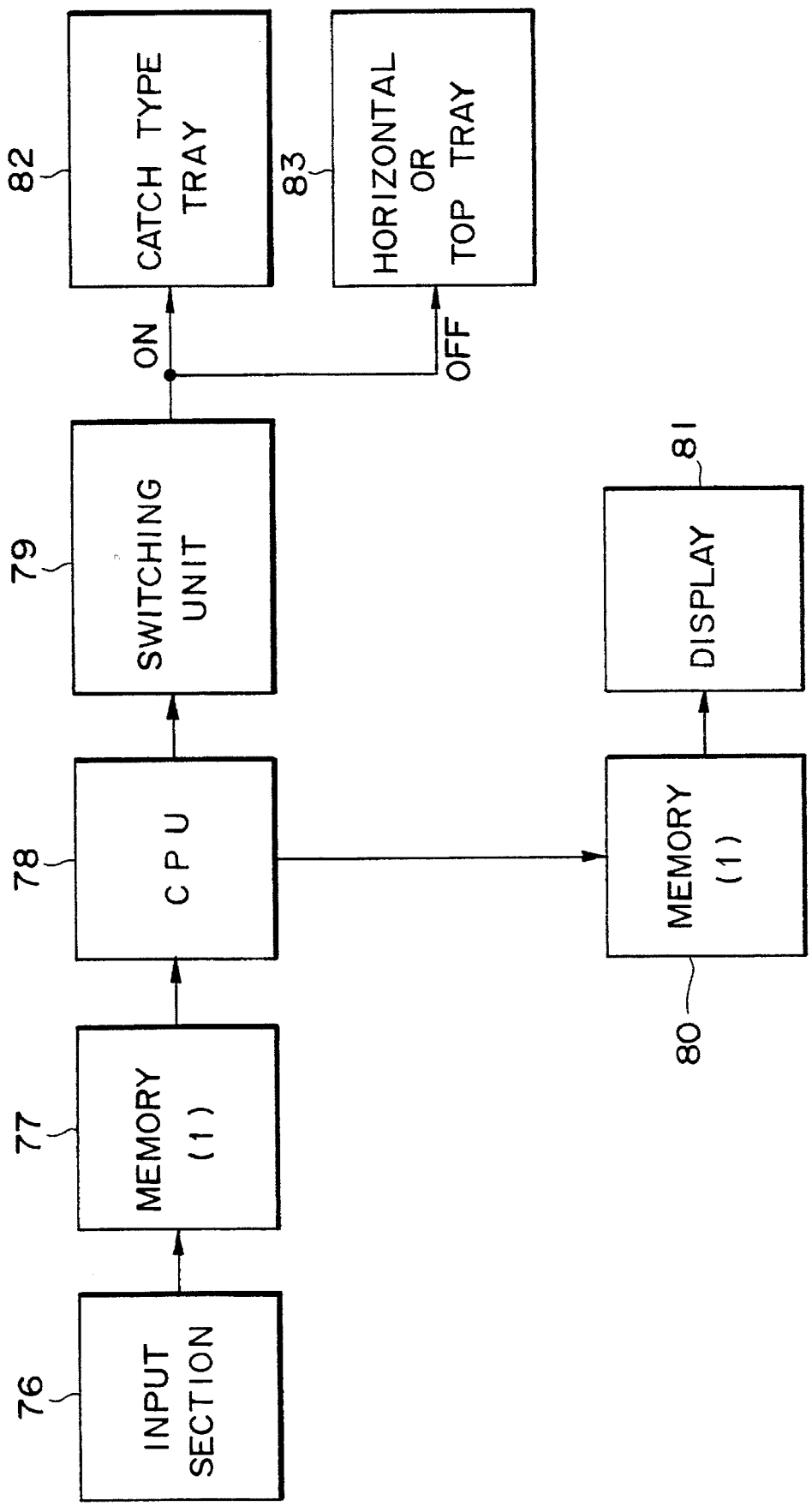
FIG. 19 is a block diagram schematically showing a specific construction of a facsimile apparatus, or image forming apparatus, with which the present invention is practicable.

FIG. 19 schematically shows a specific construction of a facsimile apparatus to which the present invention is applicable. As shown, the facsimile apparatus has an input section 76 for receiving facsimile data from a remote facsimile station. A memory (1) 77 stores received facsimile data. A CPU (Central Processing Unit) 78 determines a sheet size and other factors on the basis of the received data. A switching unit 79 selectively turns on or turns off a switch for selecting the catch type tray of the present invention on the basis of the sheet size determined by the CPU 78. A memory (2) 80 stores display data included in the received data and meant for the user. A display 81 is provided on an operating section, not shown. When the switching unit 79 switches on the associated switch, the tray 82 of the present invention is selected; when the former switches off the latter, the horizontal tray or a top tray 83 is selected.

Figure 20:
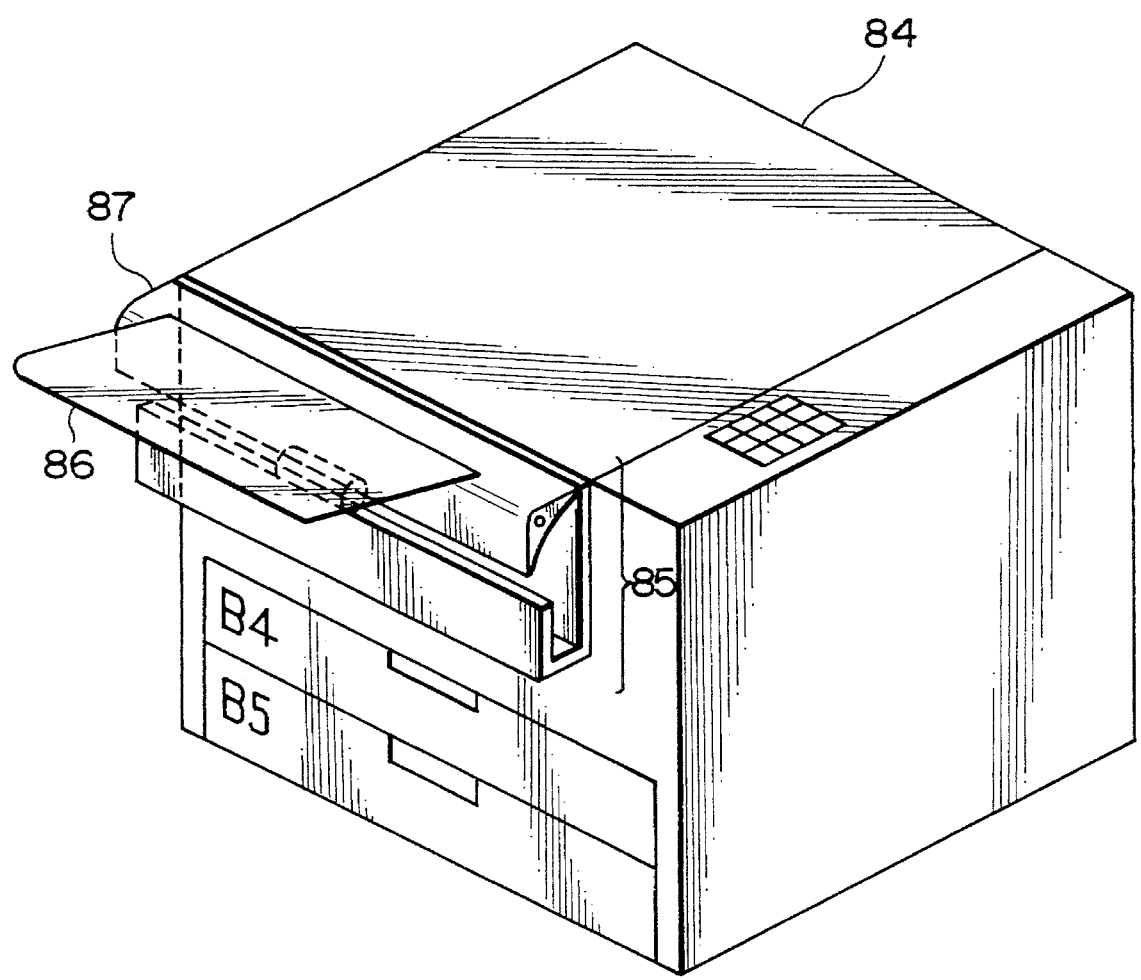
FIG. 20 is a perspective view of a facsimile apparatus with which the present invention is also practicable.

FIG. 20 is a perspective view showing a specific construction of a facsimile apparatus to which the present invention is applicable. As shown, the facsimile apparatus, generally 84, is provided with a catch type sheet tray 85 and a horizontal tray 86 which is assigned to sheets of relatively small size. A movable guide, or first steering section, 87 selectively steers sheets coming out of the apparatus 84 either to the tray 85 or the tray 86. The apparatus 84 changes the angular position of the guide 87 automatically or as commanded by the operator, based on the sheet size for printing data (B4 or B5). For example, a sheet of B5 size is small and elastic than the others. Therefore, when the sheet of B5 size is received in the holder of the sheet tray 85, it is apt to fail to hand down from the holder accurately, resulting in defective stacking or defecting discharge. In such a case, the guide 87 is so rotated as to steer sheets to the horizontal tray 86. On the other hand, a sheet of B4 size is too large to be received by the horizontal tray 86. Then, the guide 87 is rotated to steer sheets to the catch type tray 85.

Figure 21:
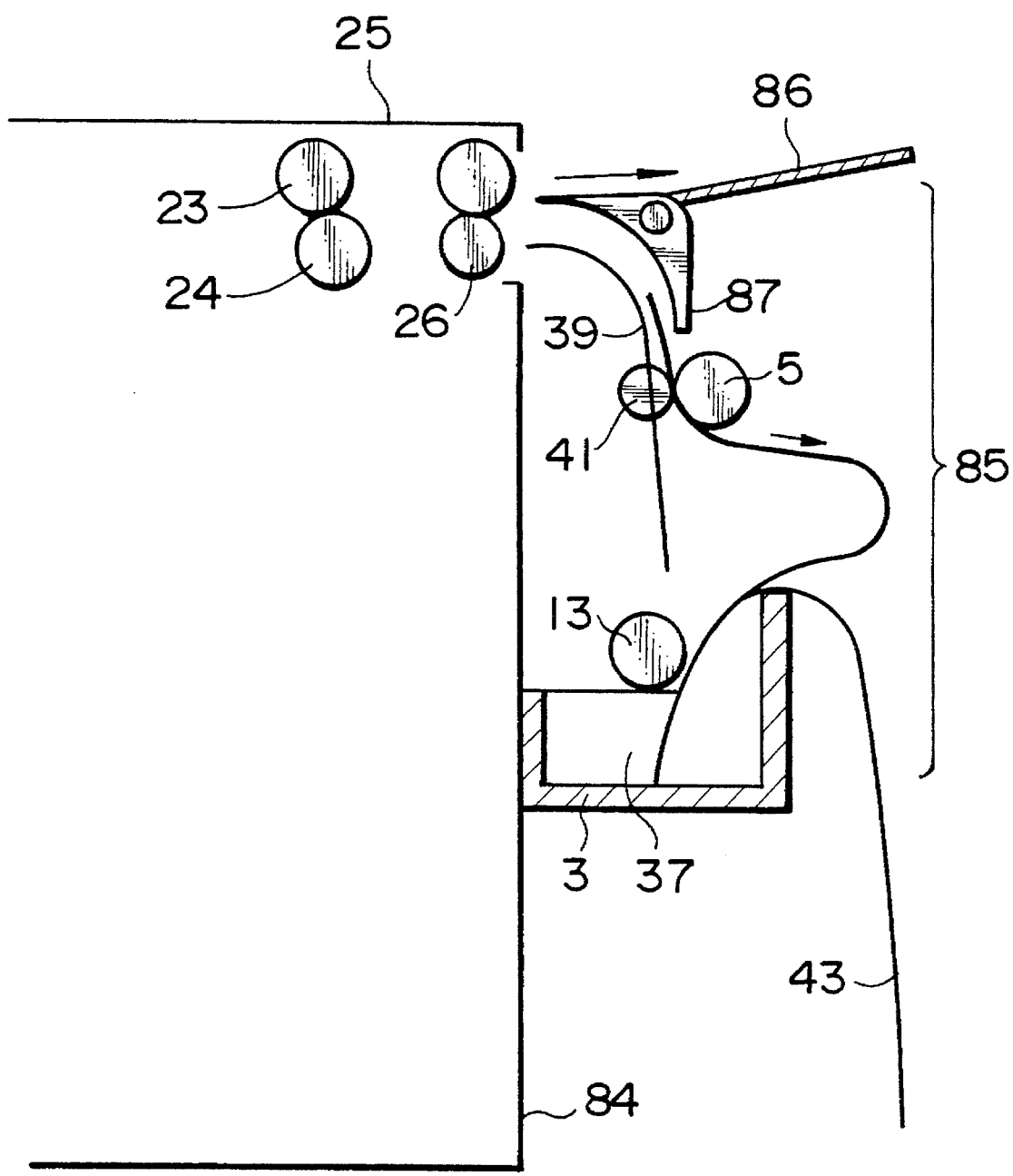
FIG. 21 is a sectional side elevation showing the construction of the apparatus of FIG. 20 specifically.

FIG. 21 shows the facsimile apparatus 84 and the section for selecting one of the trays 85 and 86 specifically. As shown, the fixing roller 23, pressure roller 24 and discharge rollers 25 and 26 are disposed in the apparatus 84, as in the arrangement of FIG. 5. In the catch type sheet tray 85, a sheet 43 coming out of the apparatus 84 is driven by the discharge roller 5 and cooperative roller 41 to the holder 3 while being guided by the lower guide 39. The conveyor roller 13 introduces the sheet 43 into the holder 3 while pressing the leading edge thereof against the abutment 37. As a result, the sheet 43 is received in the holder 3 with the trailing edge thereof hanging down at the outside of the holder 3. While the tray 85 is used, the guide 87 plays the role of the upper guide 38 shown in FIG. 5.

Figure 22A:
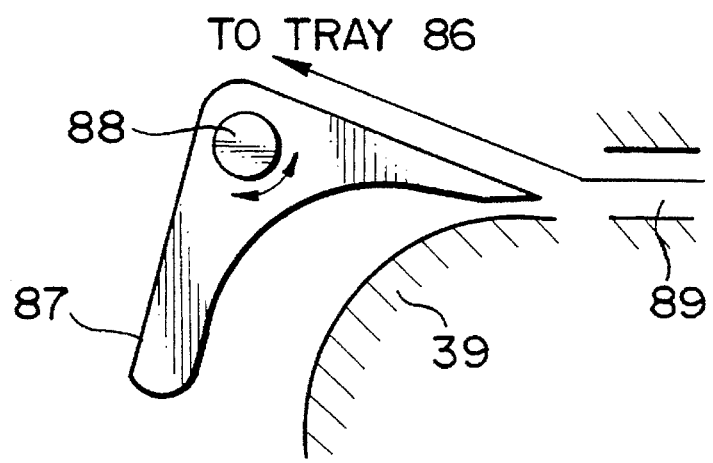
FIGS. 22A and 22B are sectional side elevations demonstrating the operation of a guide shown in FIG. 20.
Figure 22B:
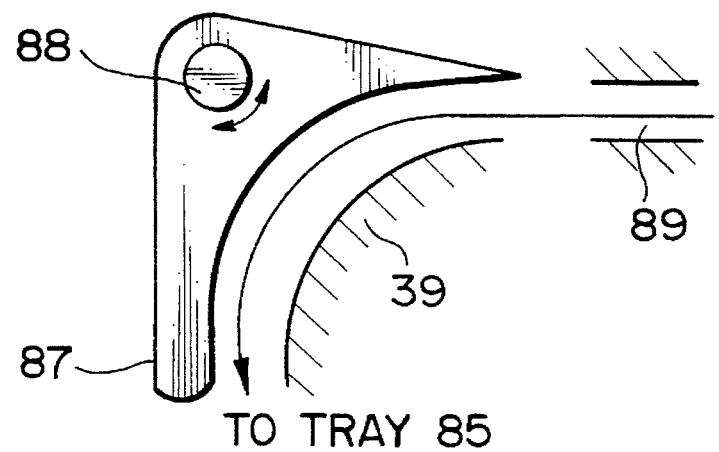

Specifically, as shown in FIGS. 22A and 22B, the guide 87 is rotatable about a shaft 88 to communicate the outlet 89 of the facsimile apparatus 84 to either of two different paths. For example, when a sheet coming out of the outlet 89 should be received in the horizontal tray 86, the guide 87 assumes the position shown in FIG. 22A. To steer such a sheet to the catch type sheet tray 85, the guide 87 assumes the position shown in FIG. 22B.

In the facsimile apparatus 84, the CPU 78, FIG. 20, determines the size and the number of sheets to use on the basis of received data. For example, the CPU 78 determines whether the sheet size to use belongs to a group consisting of A3, B4 and A4 (a first group as referred to hereinafter) or a group consisting of B5 and A5 (a second group as referred to hereinafter). If the sheet size belongs to the first group, the CPU 78 rotates the guide 87 to the position of FIG. 22B to deliver sheets to the catch type tray 85. If the sheet size belongs to the second group, the CPU 78 moves the guide 87 to the position of FIG. 22A to deliver them to the horizontal tray 86. Consequently, the guide 87 steers sheets of A4 and larger sizes to the tray 85 and steers sheets of B5 and smaller sizes to the tray 86. This successfully meets the demand for downsizing and space saving without degrading the reliability of operation.

Figure 23:
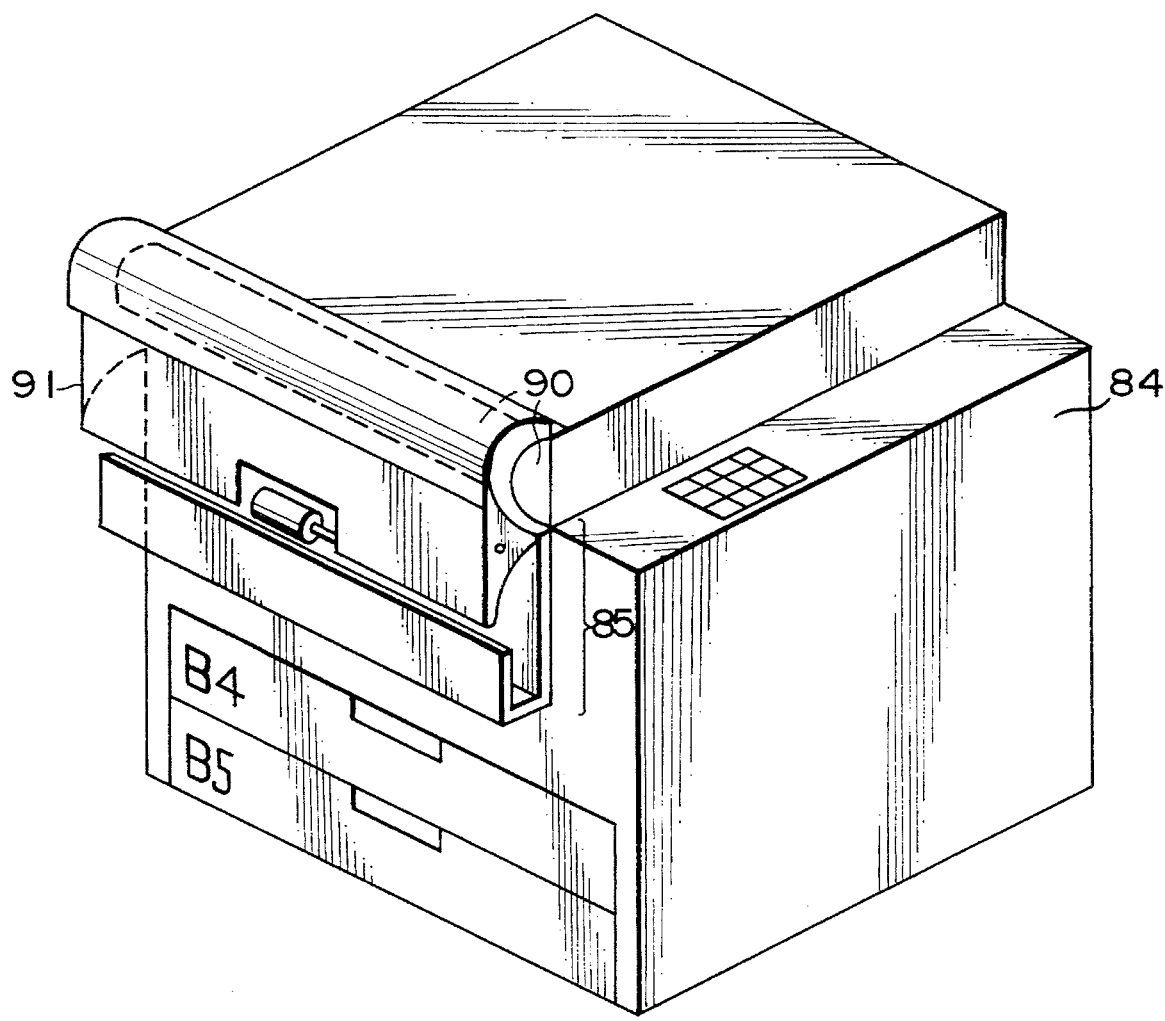
FIG. 23 shows another specific construction of the facsimile apparatus to which the present invention is applicable.

FIG. 23 shows another specific construction of the facsimile apparatus to which the present invention is applicable. As shown, the facsimile apparatus 84 has a top tray 90 in addition to the catch type sheet tray 85. A guide, or second steering section, 91 is movable to steer sheets to either of the catch type tray 85 and top tray 90. When use is made of sheets of, for example, B5 size which are small and more elastic than the others and not suitable for the tray 85, the apparatus 84 automatically changes the angular position of the guide 87 to select a path terminating at the top tray 90. It is to be noted that the sheet size may be selected manually for the operator's convenience (e.g. in the event of long absence).

Figure 24:
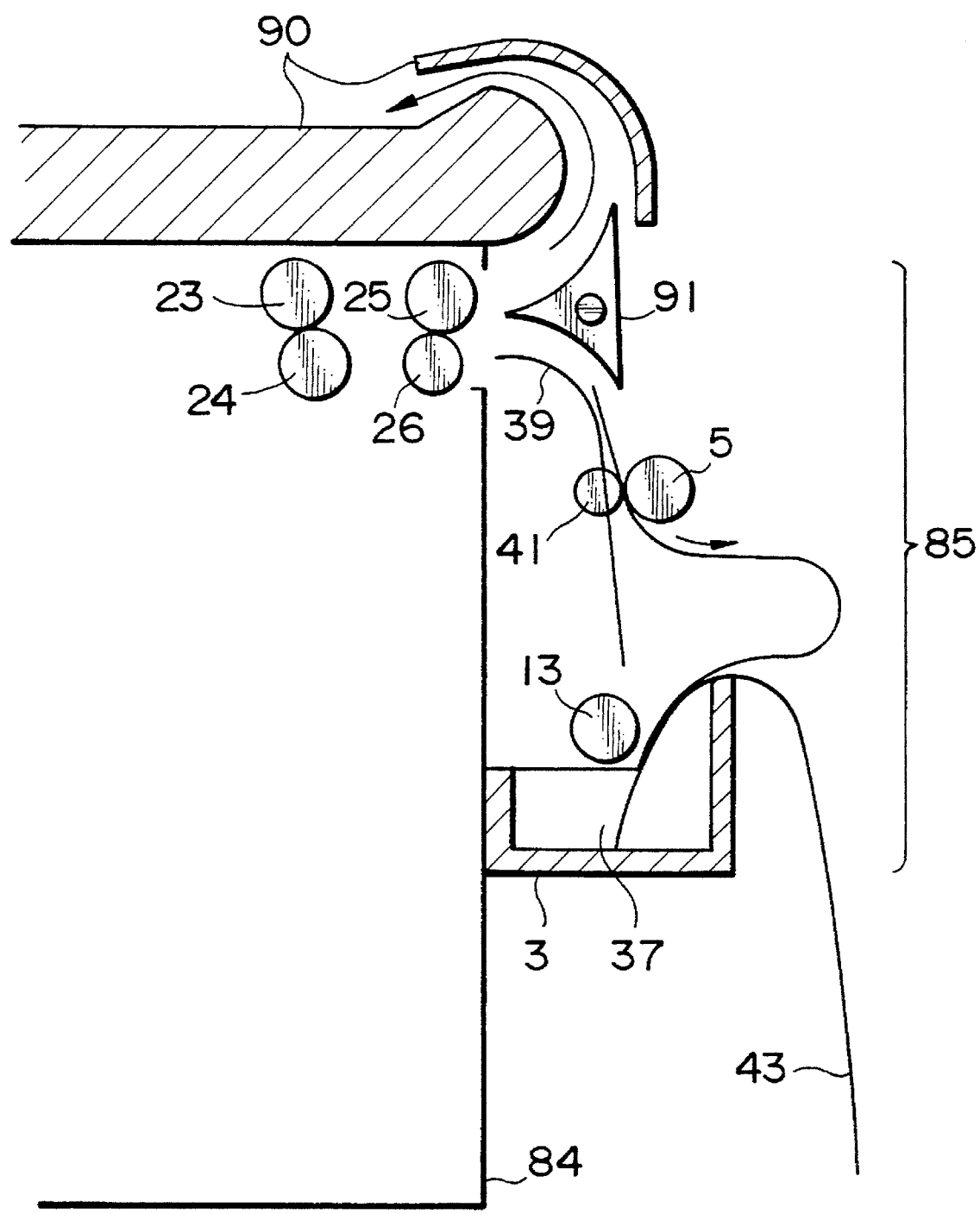
FIG. 24 is a side elevation showing a part of the apparatus of FIG. 23 specifically.

FIG. 24 shows the facsimile apparatus 84 and the section for selecting either of the two trays 85 and 90 specifically. As shown, the guide 91 is a substitute for the guide 85 of FIG. 21 and steers sheets discharged from the rollers 25 and 26 to either of the trays 85 and 90. The configuration and operation of the tray 85 are the same as described with reference to FIG. 21 and will not be described specifically.

Figure 25A:
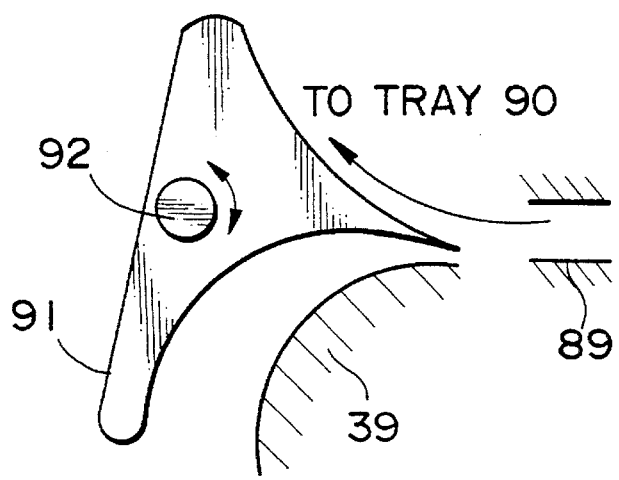
FIG. 25A and 25B are a sectional side elevations indicative of the operation of a guide shown in FIG. 23.
Figure 25B:
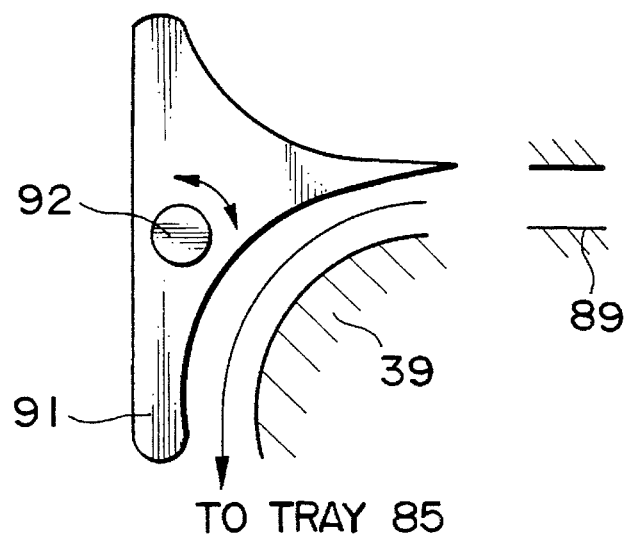

As shown in FIGS. 25A and 25B, the guide 91 is rotatable about a shaft 92 to communicate the outlet 89 of the facsimile apparatus 84 to either of two different paths. For example, when a sheet coming out of the outlet 89 should be received in the top tray 86, the guide 91 assumes the position shown in FIG. 25A. To steer such a sheet to the catch type tray 85, the guide 91 assumes the position shown in FIG. 25B. The guide 91 is controlled in the same manner as described with reference to FIG. 22. Consequently, the guide 91 steers sheets of A4 and larger sizes to the tray 85 and steers sheets of B5 and smaller sizes to the top tray 90. This successfully meets the demand for downsizing and space saving without degrading the reliability of operation.

With any one of the constructions shown in FIGS. 20–25, it is possible to record reception data, or log data, and to display it, if desired. FIGS. 26A and 26B shows specific log data relating to the reception of the facsimile apparatus of FIG. 19. Specifically, FIG. 26A shows sheet discharge log data 93 written in the memory 80, FIG. 19. The CPU, FIG. 19, determines the size and the number of sheets to use on the basis of received data and records them, every time a communication is held, together with the date, addresser, number of sheets, and tray where sheets are stacked. Such log data may be displayed on the display 81, FIG. 19, in a format 94 shown in FIG. 26B; this may be done every communication or every predetermined period of time. While FIG. 26A shows the contents of a single communication, FIG. 26B shows the contents of three consecutive communications occurred during the interval from 11.00 am to 13.20 pm collectively. In FIG. 26A, the catch type tray and the top tray, for example, are simply represented by trays A and B, respectively. Even such a representation will be readily understood if the user is experienced. If desired, the quality of sheets may also be taken into account.

As described above, the facsimile apparatuses shown in FIGS. 19–26B are capable of selectively using the trays in matching relation to the characteristic of sheets and, therefore, promote downsizing and space saving.

The embodiments described with reference to FIGS. 1–26B have various advantages, as enumerated below.

(1) The catch type tray and horizontal tray are selectively usable and, therefore, can accommodate even a great number of sheets.

(2) The torque limiter of the roller associated with the catch type tray causes the roller and drive section to idle on receiving a load heavier than predetermined one. This prevents more than a predetermined number of sheets from being fed to the tray and frees sheets from damage ascribable to the roller.

(3) Sheets once removed from the tray can be returned to the tray. Hence, sheets sequentially coming out of the facsimile apparatus are stacked reliably in association with the sheet discharge condition which depends on the condition of use of the apparatus.

(4) The belt extending in the sheet discharge direction surely causes the trailing edge of a sheet to hang down without standing upright.

(5) The catch type tray can be combined with a horizontal tray or a top tray. These trays, therefore, can be selectively used in matching relation to the characteristic of sheets.

In summary, it will be seen that the present invention provides a catch type sheet tray which can be substituted for a horizontal tray or a top tray easily. The tray of the present invention, therefore, can deal with a number of sheets of any allowable size without damaging them. This allows sheets to be stacked reliably in a condition matching the sheet discharge condition which depends on the condition of use of a facsimile apparatus or similar image forming apparatus.

Various modifications will become possible for those skilled in the art after receiving the teachings of the present disclosure without departing from the scope thereof.

What is claimed is:

1. A catch type sheet tray for an image forming apparatus in which said apparatus includes a horizontal tray and said apparatus records data in sheets and sequentially discharges said sheets to said horizontal tray via an outlet thereof, said catch type sheet tray comprising:

transporting means for transporting the sheet driven out through said outlet downward;

receiving means for receiving the sheet conveyed by said transporting means by catching a leading edge of said sheet and causing a trailing edge of said sheet to hang down outside of said receiving means; and first mounting means for mounting said transporting means on a portion of said apparatus from which said horizontal tray has been removed;

said tray being mounted on said apparatus in place of said horizontal tray by said first mounting means.

2. A tray as claimed in claim 1, further comprising second mounting means for pivotally mounting a lower end of said transporting means.

3. A tray as claimed in claim 2, further comprising first steering means for selectively steering the sheet discharged from said apparatus to said receiving means or to an alternate tray.

4. A tray as claimed in claim 3, wherein:
said alternate tray is a top tray for receiving the sheets discharged to a top of said apparatus by said steering means.

5. A tray as claimed in claim 4, further comprising control means for controlling said first steering means on the basis of a size of the sheets to be discharged from said apparatus.

6. A tray as claimed in claim 5, further comprising log data recording means for recording, every time the sheets are discharged, log data relating to sheet discharge and including at least data relating to a tray to which said sheets are delivered and data relating to a size of said sheets.

7. A tray as claimed in claim 1, further including:
conveying means rotatable to drive the sheet into said receiving means, and contacting said sheet while in rotation so as to prevent said sheet, whose trailing edge has hung down to the outside, from slipping out of said receiving means; and
first braking means for causing said conveying means to stop rotating when a frictional force acting between said conveying means and the sheet received in said receiving means reaches a predetermined value, whereby a number of sheets to be accommodated in said receiving means is limited.

8. A tray as claimed in claim 7, wherein said first braking means comprises a torque limiter mounted on a rotary shaft of said discharging means.

9. A tray as claimed in claim 7, wherein said first mounting means comprises means for removably mounting said transporting means on said apparatus to allow said transporting means to be pivoted about a shaft supporting a lower portion of said transporting means such that said transporting means is opened by pivoting said transporting means about said shaft.

10. A tray as claimed in claim 9, further comprising second braking means for causing said transporting means to stop rotating when said transporting means is opened.

11. A tray as claimed in claim 9, wherein said horizontal tray is mounted on said apparatus when said transporting means is opened.

12. A tray as claimed in claim 9, wherein said shaft supporting said transporting means constitutes said rotary shaft of said conveying means.

13. A tray as claimed in claim 9, wherein said receiving means is mounted on said shaft.

14. A tray as claimed in claim 13, wherein said receiving means is affixed to said outlet of said apparatus.

15. A tray as claimed in claim 1, further comprising biasing means for urging said receiving means against a side of said apparatus where said outlet is located.

16. A tray as claimed in claim 13, further comprising damping means for providing a damping force between said transporting means and said receiving means when said transporting means is opened or closed.

17. A tray as claimed in claim 16, wherein said damping means comprises a spring member connected between said transporting means and said receiving means to provide an increasing repulsive force as said transporting means is moved in an opening direction.

18. A tray as claimed in claim 15, wherein said biasing means comprises a spring member.

19. A tray as claimed in claim 1, further comprising holding means for holding the sheets taken out from said receiving means.

20. A tray as claimed in claim 19, wherein said holding means comprises clipping means for clipping the sheets removed from said receiving means.

21. A tray as claimed in claim 19, wherein said holding means comprises a flat magnetizable member cooperatable with a magnet clip.

22. A tray as claimed in claim 1, further comprising transmitting means for transmitting a rotating force of said image forming apparatus used to discharge the sheets to said transporting means, said transporting means transporting the sheets due to said rotating force.

23. A tray as claimed in claim 1, further comprising drive means for generating a rotating force for causing said transporting means to transport the sheets.

24. A tray as claimed in claim 23, further comprising start-up control means for selectively starting or stopping said drive means depending on whether or not the sheets from said apparatus are present.

25. A tray as claimed in claim 1, wherein said receiving means comprises casing means including a side plate and a bottom plate and wherein said side plate is movable with respect to said base plate within a predetermined range.

26. A tray as claimed in claim 1, further comprising trailing edge feeding means for feeding the trailing edge of the sheet discharged from said apparatus to the outside of said receiving means.

27. A tray as claimed in claim 26, wherein said trailing edge feeding means comprises a belt member extending in an intended direction of sheet feed.

28. A tray as claimed in claim 27, wherein said belt member is rotatably driven by a belt drive means.

29. A tray as claimed in claim 27, wherein said belt member comprises an expansible friction member.

30. A tray as claimed in claim 27, wherein said belt member is provided with a plurality of projections at spaced locations thereof.

31. A tray as claimed in claim 1, further comprising leading edge guiding means for guiding the leading edge of the sheet discharged from said apparatus to between said conveying means and the sheet received in said receiving means in contact with said conveying means.

32. A tray as claimed in claim 31, wherein said leading edge guiding means comprises a Mylar sheet held in contact with said conveying means.

33. A catch type sheet tray for an image forming apparatus in which said apparatus records data upon sheets and sequentially discharges said sheets via an outlet, said catch type sheet tray comprising:
transporting means for transporting a sheet driven out through said outlet downward;
receiving means for receiving the sheet transported by said transporting means by catching a leading edge of said sheet and causing a trailing edge of said sheet to hang down outside of said receiving means;
first mounting means for releasably mounting an upper portion of said transporting means upon said image forming apparatus; and
second mounting means for pivotally mounting a lower portion of said transporting means upon said image forming apparatus, wherein upon release of said first transporting means at said first mounting means said transporting means is pivotable upon said second mounting means to open said transporting means.

34. The catch type sheet tray of claim 33, further including a conveyor roller disposed adjacent said receiving means for driving the leading edge of a sheet into said receiving means after said leading edge is transported by said transporting means.

35. The catch type sheet tray of claim 34, wherein said conveyor roller is mounted upon a shaft, and said shaft is mounted upon said image forming apparatus, and wherein said second mounting means mounts said transporting means upon said shaft.

36. The catch type sheet tray of claim 35, wherein said receiving means are pivotally mounted upon said shaft, with said receiving means disposed below said transporting means.

37. The catch type sheet tray of claim 33, further including biasing means connected between said transporting means and said receiving means such that when said transporting means and said receiving means are mounted upon an image forming apparatus, said receiving means is biased toward said image forming apparatus.

38. The catch type sheet tray of claim 33, wherein said first mounting means includes means for mounting said transporting means upon a bracket of said image forming apparatus.

39. The catch type sheet tray of claim 33, further including a conveyor roller disposed adjacent said receiving means for driving said leading edge into said receiving means, and wherein a torque limiter is associated with said conveyor roller to halt feeding after a quantity of sheets are disposed in said receiving means.

40. The catch type sheet tray of claim 33, further including diverter means for selectively feeding a sheet to said receiving means or to an alternate tray disposed on the image forming apparatus.

* * * * *